(12) United States Patent
Kubo et al.

(10) Patent No.: US 8,817,683 B2
(45) Date of Patent: Aug. 26, 2014

(54) NETWORK RELAY APPARATUS AND INTER-NETWORK RELAY METHOD

(75) Inventors: Toshiyuki Kubo, Yokohama (JP); Keisuke Kadowaki, Ninomiya (JP); Nagayuki Hirota, Ebina (JP); Hidehiro Fukushima, Inagi (JP)

(73) Assignee: Alaxala Networks Corporation, Kanagawa (JP)

( * ) Notice: Subject to any disclaimer, the term of this patent is extended or adjusted under 35 U.S.C. 154(b) by 568 days.

(21) Appl. No.: 12/786,603

(22) Filed: May 25, 2010

(65) Prior Publication Data

US 2010/0303073 A1  Dec. 2, 2010

(30) Foreign Application Priority Data

May 28, 2009 (JP) ................. 2009-128516

(51) Int. Cl.
| | | |
|---|---|---|
| *H04H 20/76* | (2008.01) | |
| *H04B 7/14* | (2006.01) | |
| *H04W 4/00* | (2009.01) | |
| *H04L 12/28* | (2006.01) | |
| *H04J 3/26* | (2006.01) | |
| *H04B 7/15* | (2006.01) | |
| *H04B 7/00* | (2006.01) | |
| *G06F 15/173* | (2006.01) | |
| *H04L 12/00* | (2006.01) | |

(52) U.S. Cl.
USPC ........... 370/312; 370/315; 370/338; 370/390; 370/409; 370/432; 455/11.1; 455/518; 709/223; 709/249

(58) Field of Classification Search
CPC ..... H04L 12/1886; H04L 45/00; H04L 45/16; H04L 12/18; H04L 12/185; H04L 12/66

USPC .......................................... 370/390, 401, 330
See application file for complete search history.

(56) References Cited

U.S. PATENT DOCUMENTS 7,751,394 B2 * 7/2010 Takihiro et al. ............... 370/390
8,064,445 B2 * 11/2011 Okubo et al. ................. 370/390

(Continued)

FOREIGN PATENT DOCUMENTS

| JP | 2001-111591 A | 4/2001 |
|---|---|---|
| JP | 2005-244904 | 9/2005 |

(Continued)

OTHER PUBLICATIONS

B. Fenner et al., Protocol Independent Multicast—Sparse Mode (PIM-SM): Protocol Specification (Revised), RFC 4601, Feb. 2006, 112 pp.

(Continued)

*Primary Examiner* — Alpus H Hsu
*Assistant Examiner* — Anthony Luo
(74) *Attorney, Agent, or Firm* — Mattingly & Malur, PC

(57) ABSTRACT

In a network relay router 10, a multicast routing protocol processing module 11A sequentially sends a join request message (CP1) to a router 30a functioning as a rendezvous point via an interface 101, based on the settings of a multicast group address or destination address and a sender VRF name. The network relay router 10 receives a multicast packet (DP1) from the router 30a via the interface 101 and acquires a sender address or source address of a transmission device SE from the received multicast packet. The network relay router 10 sends a join request message (CP2) via an interface 102 on the side of the transmission device SE and receives a multicast packet via the interface 102. This establishes an optimum multicast route (MR) between the transmission device SE and the network relay router 10.

11 Claims, 17 Drawing Sheets

(56) References Cited

U.S. PATENT DOCUMENTS

| | | | |
|---|---|---|---|
| 8,189,528 B2* | 5/2012 | Umesh et al. | 370/330 |
| 2005/0190765 A1* | 9/2005 | Gotoh et al. | 370/390 |
| 2007/0268919 A1* | 11/2007 | Sarikaya et al. | 370/401 |
| 2008/0285497 A1* | 11/2008 | Pichna et al. | 370/312 |

FOREIGN PATENT DOCUMENTS

| | | |
|---|---|---|
| JP | 2006-135508 A | 5/2006 |
| JP | 2007-173898 A | 7/2007 |
| JP | 2007-173899 A | 7/2007 |

OTHER PUBLICATIONS

B. Fenner et al., Multicast Source Discovery Protocol {MSDP), RFC 3618, Oct. 2003, 19 pp.

E. Rosen et al., BGP/MPLS IP Virtual Private Networks (VPNs), RFC 4364, Feb. 2006, 47 pp.

Alaxala, AX6700S-AX6300S Software Manual Configuration Guide, 2006, 7 pp., vol. 3, Alaxala Networks Corporation, Japan.

JP Office Action in JP Application No. 2009-128516, dated May 15, 2012.

* cited by examiner

| SOURCE | GROUP | IVRF | IIF | OVRF | OIF |
|---|---|---|---|---|---|
| Server1_Addr | Group1_Addr | VRF51A | IF102 | VRF51B | - |

| GROUP | IVRF | OVRF |
|---|---|---|
| Group1_Addr | VRF51A | VRF51B |

| SOURCE | GROUP | IVRF | IIF | OVRF | OIF |
|---|---|---|---|---|---|
| Server1_Addr | Group1_Addr | VRF51A | IF102 | VRF51B | - |

Fig.12

| SOURCE | GROUP | IVRF | IIF | OVRF | OIF |
|---|---|---|---|---|---|
| Server1_Addr | Group1_Addr | VRF51A | — | VRF51B | IF105 |

Fig.13

| SOURCE | GROUP | IVRF | IIF | OVRF | OIF |
|---|---|---|---|---|---|
| Server1_Addr | Group1_Addr | VRF51A | IF102 | VRF51B | IF105 |

Fig.14

| SOURCE | GROUP | IVRF | IIF | OVRF | OIF |
|---|---|---|---|---|---|
| Server1_Addr | Group1_Addr | VRF51A | IF102 | VRF51B | IF105 |

Fig.17

| SOURCE | GROUP | IVRF | IIF | OVRF | OIF |
|---|---|---|---|---|---|
| Server1_Addr | Group1_Addr | VRF51A | IF102 | VRF51B | IF105 |

Fig.18

| SOURCE | GROUP | IVRF | IIF | OVRF | OIF |
|---|---|---|---|---|---|
| Server1_Addr | Group1_Addr | VRF51A | IF102 | - | - |

Fig.19

| SOURCE | GROUP | IVRF | IIF | OVRF | OIF |
|---|---|---|---|---|---|
| Server1_Addr | Group1_Addr | VRF51A | IF102 | - | - |

| SOURCE | GROUP | IVRF | IIF | OVRF | OIF |
|---|---|---|---|---|---|
| Server1_Addr | Group1_Addr | VRF51A | IF102 | VRF51B | - |

| SOURCE | GROUP | IVRF | IIF | OVRF | OIF |
|---|---|---|---|---|---|
| Server1_Addr | Group1_Addr | VRF51A | - | VRF51B | - |

Fig.23

| SOURCE | GROUP | IVRF | IIF | OVRF | OIF |
|---|---|---|---|---|---|
| Server1_Addr | Group1_Addr | VRF51A | IF102 | VRF51B | IF105 |

Fig.24

| SOURCE | GROUP | IVRF | IIF | OVRF | OIF |
|---|---|---|---|---|---|
| Server1_Addr | Group1_Addr | VRF51A | IF102 | VRF51B | IF105 |

NETWORK RELAY APPARATUS AND INTER-NETWORK RELAY METHOD

BACKGROUND

The present invention relates to a multicast relay technique and specifically pertains to a multicast communication technique between logically independent networks.

One known technique of simultaneously sending a packet to multiple receiving devices or receivers in a network is multicast technique where a router receives a single packet and outputs duplicates of the received packet to multiple lines. The multicast technique allows for packet transmission to multiple receiving devices as destinations by utilizing a less amount of packets, compared with the unicast technique where a transmission device or a sender sends a packet multiple times to respective destinations. The multicast technique is especially suitable for real-time multimedia communication requiring high traffic, such as streaming or teleconference.

In order to allow for transmission of a multicast packet to only an authenticated user of the multicast packet, selection of an adequate line is required when a router arranged in a network outputs the multicast packet to multiple lines. PIM-SM (Protocol Independent Multicast-Sparse Mode: IETF, 'Protocol Independent Multicast-Sparse Mode (PIM-SM): Protocol Specification (Revised)', RFC4601) and PIM-SSM (Protocol Independent Multicast-Source Specific Multicast) are known examples of multicast routing protocol of automatically performing optimum line selection.

As is known, for communication in each logically independent network VPN (Virtual Private Network), VRF (Virtual Routing and Forwarding) function is provided in each VPN to enable the routing protocol. The VRF technique provides an independent routing table for each VPN and is under management of a router establishing each VPN, so as to allow for communication in each VPN (IETF, 'BGP/MPLS IP Virtual Private Networks (VPNs)', RFC4364). In the VRF technique, multiple routers are required for management of VRFs in a distributed manner. This leads to the cost increase and the rather complicated network management. A technique has thus been proposed to allow for centralized management of multiple VRFs by one single router (AX6700S AX6300S Software Manual Ver. 11.0, Configuration Guide Vol. 3 31. Network Partition).

In a network configuration where one single router is in charge of centralized management of multiple VRFs and independently makes multicast communication in each VPN, inter-VRF communication is not allowed. A receiving device belonging to a different VPN from a VPN which a transmission device participates in is thus not allowed to receive a multicast packet from the transmission device.

With a view to receiving a multicast packet from a transmission device belonging to a different VPN from a VPN which a receiving device participates in, one proposed technique identifies the transmission device in advance and utilizes the PIM-SSM protocol to implement inter-VRF multicast routing. With a view to allowing for multicast communication between individually-operated multiple PIM-SM networks, one proposed technique utilizes MSDP (Multicast Source Discovery Protocol) to exchange transmission device information between rendezvous points of the respective PIM-SM networks (IETF, 'Multicast Source Discovery Protocol (MSDP)', RFC3618).

The PIM-SSM protocol technique requires previous specification of a transmission device of multicast data and is not capable of receiving multicast packets from an unspecified number of transmission devices. The MSDP technique requires settings of information on opposed rendezvous points in rendezvous points of respective VPNs and information for activating and operating the MSDP, with a view to receiving multicast data from an unspecified number of transmission devices. There is difficulty in such settings especially when multiple different networks are managed by different network administrators. The VPN network information and the VPN configuration should be shared by multiple VPNs. This may represent a breach of security in each VPN. The combined use of MSDP with PIM-SM increases the number of protocols to be managed and thereby undesirably complicates the network management.

SUMMARY OF THE INVENTION

In order to solve at least part of the problems described above, it is required to provide simple and easy multicast communication between multiple different networks using an unspecified number of transmission devices.

The present invention accomplishes at least part of the requirement mentioned above and the other relevant requirements by the following configurations and arrangements.

According to a first aspect of the present invention, there is provided a network relay apparatus constructed to relay a multicast packet between logically different multiple networks. The network relay apparatus according to the first aspect of the invention includes a first management module configured to manage a first network, a second management module configured to manage a second network, and an intra-device relay module configured to relay a multicast packet between the first management module and the second management module. The first management module has a transmission device information acquisition module configured to acquire transmission device information used for identifying a transmission device in the first network, a first communication route establishment module configured to refer to the acquired transmission device information and establish a communication route from the transmission device in the first network to the first management module, and a transfer module configured to transfer a multicast packet, which is received from the transmission device via the established communication route, to the intra-device relay module. The second management module has a multicast packet receiving module configured to receive the multicast packet from the intra-device relay module, and a multicast packet transmission module configured to send the received multicast packet to a receiving device in the second network, which makes a request for receiving a multicast packet from the first network. The intra-device relay module has a relay information storage module configured to store a relay condition for a multicast packet to be relayed from the first management module to the second management module, and an intra-device transmission module configured to relay the multicast packet from the first management module to the second management module, based on the stored relay condition.

The network relay apparatus according to the first aspect of the invention acquires the transmission device information used for identifying the transmission device in the first network and establishes the communication route from the transmission device in the first network to the first management module by taking advantage of the acquired transmission device information. The network relay device sends the multicast packet from the first management module to the second management module, based on the relay condition of the multicast packet to be relayed from the first management module to the second management module, and thereby sends the multicast packet to the receiving device in the second network. This arrangement allows for easy and simple multicast communication between multiple different networks.

In one preferable embodiment of the network relay apparatus according to the first aspect of the invention, the second management module further has a second communication route establishment module configured to, in response to reception of a multicast packet from the first management module via the intra-device relay module, establish a route for sending the multicast packet to the receiving device. The network relay device of this embodiment functions as a transmission device in the second network.

In another preferable embodiment of the network relay apparatus according to the first aspect of the invention, the intra-device relay module further has an intra-device route information exchange module configured to exchange information on the first network, the acquired transmission device information, information on the second network, and receiving device information used for identifying the receiving device, between the first management module and the second management module. This arrangement allows for establishment of a multicast packet route between the first management module and the second management module.

In still another preferable embodiment of the network relay apparatus according to the first aspect of the invention, the transmission device information acquisition module in the first management module sends a join request for a preset multicast group to the first network, in order to acquire the transmission device information. This arrangement allows for easy and simple multicast communication between multiple different networks using an unspecified number of transmission devices.

In one preferable application of the network relay apparatus of this embodiment, the transmission device information acquisition module in the first management module sends the join request to the first network at preset time intervals, in order to acquire the transmission device information. The relay condition is set to correlate a sender management module and a receiver management module involved in inter-network relay with the preset multicast group. The intra-device transmission module in the intra-device relay module relays the multicast packet from the first management module to the second management module, based on the relay condition including assignment of the first management module and the second management module respectively to the sender management module and to the receiver management module. In this application, the network relay device functions as a receiving device in the first network, while functioning as a transmission device in the second network. This arrangement accordingly allows for easy and simple multicast transmission between multiple different networks.

In one preferable embodiment of the network relay apparatus according to the first aspect of the invention, in response to reception of a join request for the preset multicast group from the receiving device in the second network, the second management module sends a request for transmission of a join request to the transmission device information acquisition module in the first management module via the intra-device relay module. The transmission device information acquisition module receives the request for transmission of the join request from the intra-device relay module and sends the join request to the first network. The network relay apparatus of this embodiment sends the join request to the first network, in response to the request from the receiving device in the second network. This arrangement desirably prevents or restricts unnecessary packet transmission, thus reducing the traffic.

In one preferable embodiment of the invention, the network relay apparatus of the above application further includes a relay information generation module configured, when a join request for the preset multicast group is received from the receiving device in the second network, to generate an entry of correlating assignment of the second management module to the receiver management module with the preset multicast group as the relay condition, and when a multicast packet is received from the transmission device in the first network as a response to transmission of the join request for the preset multicast group, to add assignment of the first management module to the sender management module to the entry. This arrangement does not require previous setting of the relay condition but enables the network relay apparatus to set the relay condition. The network relay apparatus of this embodiment allows for easy and simple relay of a multicast packet between multiple different networks.

In another preferable embodiment of the network relay apparatus according to the first aspect of the invention, the intra-device transmission module in the intra-device relay module relays the multicast packet from the first, management module to the second management module, based on the relay condition including assignment of the first management module and the second management module respectively to a sender management module and to a receiver management module involved in inter-network relay. The network relay apparatus of this embodiment allows for relay of a multicast packet from the first management module to the second management module, based on the multicast group.

The network relay apparatus according to the first aspect of the invention may function as a rendezvous point in the second network. This arrangement enables the network relay apparatus to receive a join request for the preset multicast group from the receiving device in the second network and to send a multicast packet of the preset multicast group to the receiving device.

In another preferable embodiment of the network relay apparatus according to the first aspect of the invention, the second management module further has a second communication route establishment module configured to, in response to reception of a join request for the preset multicast group from the receiving device in the second network, establish a route for sending a multicast packet to the receiving device. The network relay apparatus of this embodiment allows for establishment of a communication route to the receiving device in the second network, which is triggered by reception of the join request for the preset multicast group from the receiving device.

The network relay apparatus according to the first aspect of the invention may function as a rendezvous point in the first network. This arrangement enables the network relay apparatus to receive a multicast packet from any number of transmission devices in the first network.

In the network relay apparatus according to the first aspect of the invention, the preset multicast group may not overlap with another multicast group in the second network. It is thus identifiable, based on the multicast group, which is required between intra-network multicast relay for relaying a multicast packet within one network and an inter-network multicast relay for relaying a multicast packet between different networks. This arrangement allows for easy and simple relay of a multicast packet between multiple different networks.

In another preferable embodiment of the network relay apparatus, the relay condition stored in the relay information storage module includes a multicast group address, which is settable independently of a combination of the first management module and the second management module and is specified either as an individual address or an address range. The network relay apparatus of this embodiment desirably has the enhanced degree of freedom of setting the multicast group address.

According to a second aspect of the present invention, there is provided an inter-network relay method adopted in a network relay apparatus constructed to relay a multicast packet between logically different multiple networks. The inter network relay method according to the second aspect of the invention acquires transmission device information used for identifying a transmission device in a first network. The inter-network relay method subsequently refers to the acquired transmission device information and establishes a communication route from the transmission device in the first network to a first management module that is configured to manage the first network. The inter-network relay method transfers a multicast packet, which is received from the transmission device via the established communication route, to an intra-device relay module, which is configured to relay a multicast packet between the first management module and a second management module that is configured to manage a second network. The inter-network relay method sends the transferred multicast packet from the intra-device relay module to the second management module, based on a relay condition for the multicast packet to be relayed from the first management module to the second management module, and eventually sends the multicast packet received from the intra-device relay module to a receiving device in the second network, which makes a request for receiving a multicast packet from the first network.

The inter-network relay method according to the second aspect of the invention has the similar functions and effects to those of the network relay apparatus according to the first aspect of the invention described above. Various embodiments and arrangements applied to the network relay apparatus according to the first aspect of the invention are similarly applicable to the inter-network relay method according to the second aspect of the invention.

The inter-network relay method according to the second aspect of the invention may be actualized by a network relay program, as well as by a computer readable medium with the network relay program recorded therein.

BRIEF DESCRIPTION OF THE DRAWINGS

FIG. 12 is an explanatory diagrammatic representation of a multicast route computation table stored in the receiver VRF after reception of a PIM(S,G)join message;

FIG. 13 is an explanatory diagrammatic representation of the multicast route computation table stored in the receiver VRF after acquisition of IIF information;

FIG. 14 is an explanatory diagrammatic representation of the multicast route computation table stored in the sender VRF after addition of OIF information;

FIG. 17 is an explanatory diagrammatic representation of the multicast route computation table stored in the receiver VRF before reception of the PIM(S,G) prune message;

FIG. 18 is an explanatory diagrammatic representation of the multicast route computation table stored in the receiver VRF after reception of the PIM(S,G) prune message via an interface;

FIG. 19 is an explanatory diagrammatic representation of the multicast route computation table stored in the sender VRF after reception of the PIM(S,G) prune message via the interface;

FIG. 23 is an explanatory diagrammatic representation of the multicast route computation table stored in the receiver VRF after reception of a Report message from a receiving device RE;

FIG. 24 is an explanatory diagrammatic representation of the multicast route computation table stored in the sender VRF after additional registry of OIF information by an inter-VRF gateway processing module after reception of the Report message;

DETAILED DESCRIPTION OF THE PREFERRED EMBODIMENTS

First Embodiment

Configuration of Multicast Network

Figure 1:
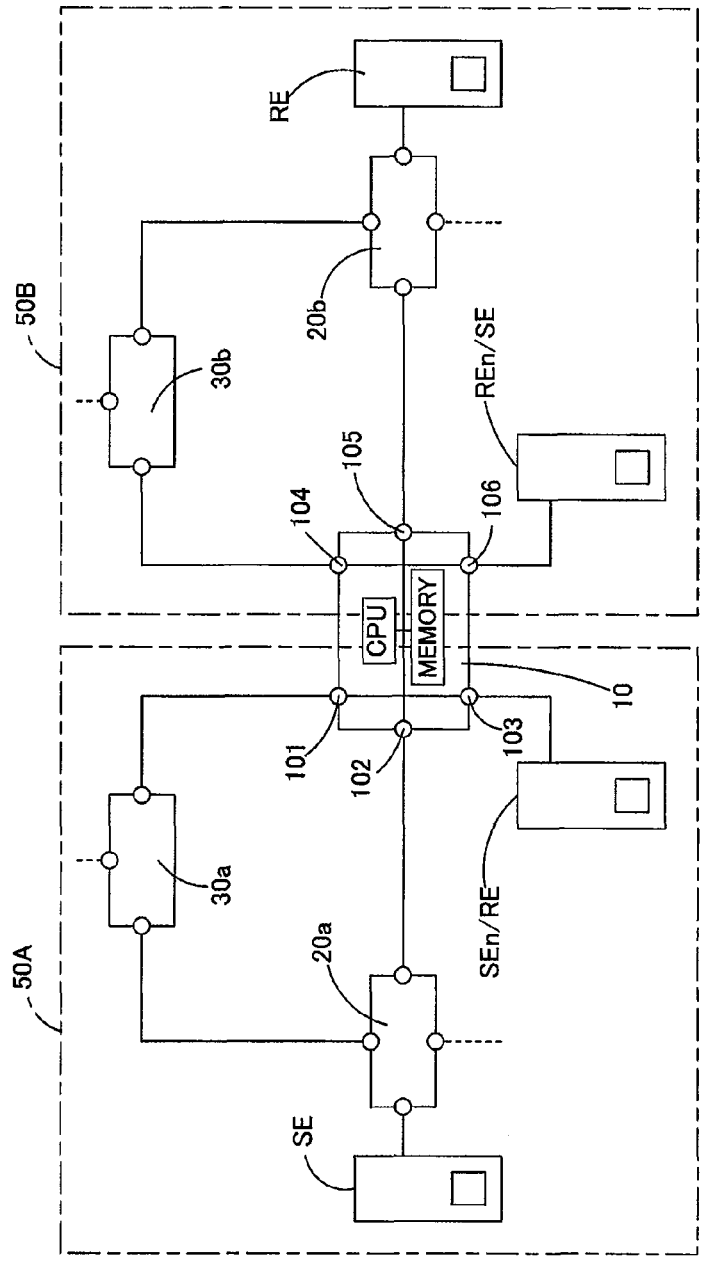
FIG. 1 is an explanatory diagrammatic representation of a multicast network configuration according to a first embodiment of the invention.

FIG. 1 is an explanatory diagrammatic representation of a multicast network configuration according to a first embodiment of the invention. A network relay router 10 as one embodiment of the network relay apparatus according to the invention establishes and has a first VPN (virtual private network) 50A and a second VPN 50B. Each of the first and the second VPNs 50A and 50B forms a PIM-SM multicast network. The first VPN 50A is constructed by routers 20a and 30a and the network relay router 10, wherein the router 30a functions as a rendezvous point. The second VPN 50B is constructed by routers 20b and 30b and the network relay router 10, wherein the router 30b functions as a rendezvous point. The first VPN 50A and the second VPN 50B respectively correspond to the first network and the second network in the claims of the invention.

In the first VPN 50A, the router 30a functioning as the rendezvous point is connected with the router 20a and the network relay router 10 and may further be connectable with other routers (not shown). The router 20a is connected with a transmission device SE and may further be connectable with other routers (not shown). The network relay router 10 may be connectable with computing machinery functioning either as a transmission device SE or as a receiving device RE, as well as with other routers (not shown).

In the first VPN 50A, the network relay router 10 of the embodiment functions as a receiving device. In response to reception of a report message from the receiving device, each router sends a join message (*,G)join for participating in a multicast group to the router 30a. In the PIM-SM protocol, a join request message from a router connecting with a receiving device and a multicast packet from a transmission device are both sent to a router functioning as a rendezvous point. An address of the router 30a is set in advance as a destination address of a join message for a multicast group to be sent from each router. In response to reception of a join request message, the router 20a sends an encapsulated multicast packet or register packet to the router 30a. The router 30a subsequently sends a decapsulated multicast packet to the network relay router 10 and other downstream routers. When receiving the multicast packet from the router 30a, each router refers to a source address or a sender IP address written in an IP header of the received multicast packet and sends group information (S,G)join to the transmission device SE or the router 20a via a shortest route by taking advantage of existing unicast routing information. This results in establishing a shortest communication route between the router 20a and the network relay router 10. A multicast packet is then sent from the router 20a to the network relay router 10 via the established shortest communication route.

In the second VPN 50B, the router 30b functioning as the rendezvous point is connected with the router 20b and the network relay router 10 and may further be connectable with other routers (not shown). The router 20b is connected with a receiving device RE and may further be connectable with other routers (not shown). The network relay router 10 may be connectable with computing machinery functioning either as a transmission device SE or as a receiving device RE, as well as with other routers (not shown).

In the second VPN 50B, the network relay router 10 of the embodiment functions as a transmission device. Until establishment of a shortest route between each router and the network relay router 10 as the transmission device, a multicast packet from the transmission device is received by each router via the router 30b. When a multicast group newly participates in the second VPN 50B, the network relay router 10 as the transmission device does not have information on a communication route to a router belonging to the newly participating multicast group. The network relay router 10 accordingly sends an encapsulated multicast packet to the router 30b functioning as the rendezvous point, in response to a join request message. After receiving a group information (S,G) message for establishing a shortest route from a router or receiving device RE belonging to the newly participating multicast group, the network relay router 10 sends a multicast packet to each router via the established shortest route.

As described above, the network relay router 10 of the embodiment works as the receiving device in the first VPN 50A to receive a multicast packet from the transmission device SE, while working as the transmission device in the second VPN 50B to send a multicast packet, which is received from the transmission device SE belonging to another network or the first VPN 50A, to the receiving device RE.

The routers 20a, 20b, 30a, and 30b of the embodiment are all constructed as routers on which the PIM-SM protocol is activated.

Structure of Network Relay Router

Figure 2:
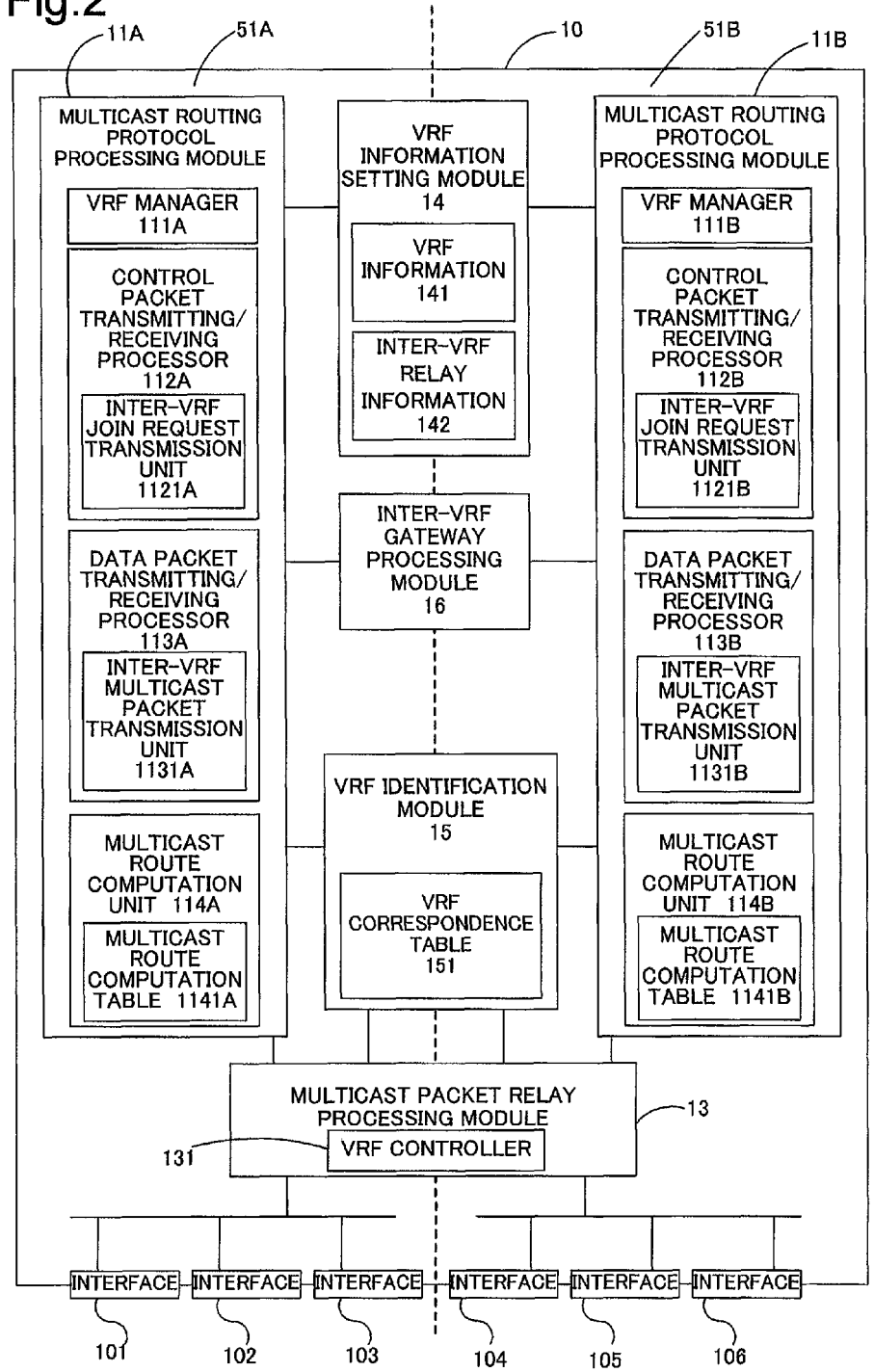
FIG. 2 is a functional block diagram showing the internal structure of a network relay router of the embodiment.
Figures 3, 4, 5:
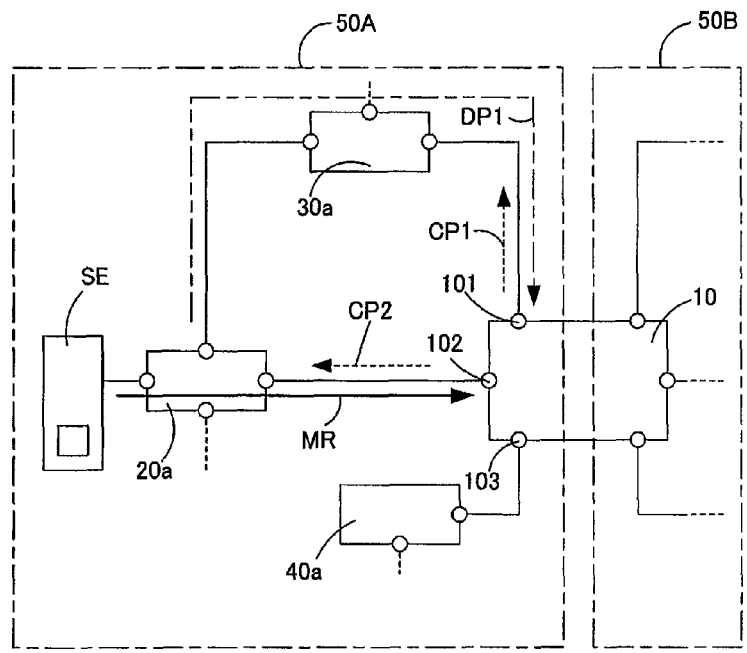
FIG. 3 is an explanatory diagrammatic representation of one example of a multicast route computation table of the embodiment.
FIG. 4 is an explanatory diagrammatic representation of one example of inter-VRF relay information of the embodiment.
FIG. 5 is an explanatory diagrammatic representation of the flows of control packets and data packets when the network relay router of the embodiment behaves as a PIM-SM router connecting with a receiving device in a first VPN.

FIG. 2 is a functional block diagram showing the internal structure of the network relay router 10 of the embodiment. FIG. 3 is an explanatory diagrammatic representation of one example of a multicast route computation table of the embodiment. FIG. 4 is an explanatory diagrammatic representation of one example of inter-VRF relay information of the embodiment. The network relay router 10 of this embodiment relays a multicast packet between the first VPN 50A and the second VPN 50b, in addition to relaying a multicast packet between input/output interfaces 101, 102, and 103 in the first VPN 50A and between input/output interfaces 104, 105, and 106 in the second VPN 50B.

The network relay router 10 includes first and second multicast routing protocol processing modules 11A and 11B, a multicast packet relay processing module 13, a VRF information setting module 14, a VRF identification module 15, and an inter-VRF gateway processing module 16. The first VPN 50A and the second VPN 50B are implemented by correlating individual VPN routing and forwarding (VRF) tables with the respective input/output interfaces. Namely the physically single network relay router 10 is used as logically independent multiple routers, so that the network relay router 10 is capable of establishing and having multiple different logical networks. In this embodiment, 'VPN' represents a logical network established by the network relay router 10, and 'VRF' represents a function implementing the logical network. Namely the first VPN 50A and the second VPN 50B are implemented by VRF functions 51A and 51B (hereafter simply referred to as VRFs 51A and 51B). The VRFs 51A and 51B respectively include the first and the second multicast routing protocol processing modules 11A and 11B and share the multicast packet relay processing module 13, the VRF information setting module 14, the VRF identification module 15, and the inter-VRF gateway processing module 16. The first and the second multicast routing protocol processing modules 11A and 11B, in combination with at least part of the multicast packet relay processing module 13, the VRF information setting module 14, and the VRF identification module 15, are equivalent to the first management module and the second management module in the claims of the invention. The inter-VRF gateway processing module 16 and inter-VRF relay information 142 correspond to the intra-device relay module in the claims of the invention.

The network relay router 10 has a CPU and a memory as shown in FIG. 1. Programs and software modules for implementing the first and the second multicast routing protocol processing modules 11A and 11B, the multicast packet relay processing module 13, the VRF information setting module 14, the VRF identification module 15, and the inter-VRF gateway processing module 16 of the embodiment are stored in the memory. Namely the CPU executes the programs and the software modules stored in the memory to implement the first and the second multicast routing protocol processing modules 11A and 11B, the multicast packet relay processing module 13, the VRF information setting module 14, the VRF identification module 15, and the inter-VRF gateway processing module 16 of the embodiment. The multicast packet relay processing module 13 of the embodiment may alternatively be implemented as a hardware component, for example, a semiconductor integrated circuit.

The first and the second multicast routing protocol processing modules 11A and 11B respectively include VRF managers 111A and 111B, control packet transmitting/receiving processors 112A and 112B, data packet transmitting/receiving processors 113A and 113B, and multicast route computation units 114A and 114B. The multicast routing protocol processing modules 11A and 11B respectively perform multicast packet relay control in the first VPN 50A and in the second VPN 50B. The control packet transmitting/receiving processors 112A and 112B, the data packet transmitting/receiving processors 113A and 113B, and the multicast route computation units 114A and 114B are provided for the PIM-SM operations.

Each of the VRF managers 111A and 111B acquires and keeps a relevant record of VRF information from VRF information 141 stored in the form of a table in the VRF information setting module 14. The relevant record of VRF information kept by each of the VRF managers 111A and 111B is used to define the interfaces included in the corresponding VRF. Each of the multicast routing protocol processing modules 11A and 11B sends and receives a multicast packet between the input/output interfaces belonging to the corresponding VRF, based on the kept relevant record of VRF information.

The control packet transmitting/receiving processors 112A and 112B send and receive various control packets, such as a join message, a prune message, and a register message. The control packet transmitting/receiving processors 112A and 112B respectively include inter-VRF join request transmission units 1121A and 1121B to implement transmission of a multicast packet between the first VPN 50A and the second VPN 50B. Each of the inter-VRF join request transmission units 1121A and 1121B refers to sender VRF name and a multicast group address set in inter-VRF relay information 142 and identifies whether its own VRF name matches with the set sender VRF name. In the case of matching, the inter-VRF join request transmission unit 1121A or 1121B sequentially sends a PIM (*,G)join message for the multicast group to the rendezvous point of its own VPN. The control packet transmitting/receiving processors 112A and 112B are equivalent to the relay information generation module in the claims of the invention. The inter-VRF join request transmission unit 1121A corresponds to the first communication route establishment module in the claims of the invention.

The data packet transmitting/receiving processors 113A and 113B send and receive a multicast packet in the first VPN 50A and in the second VPN 50B. The data packet transmitting/receiving processors 113A and 113B respectively include inter-VRF multicast packet transmission units 1131A and 1131B to implement transmission of a multicast packet between the first VPN 50A and the second VPN 50B. The inter-VRF multicast packet transmission unit 1131A sends a multicast packet, which is received from the transmission device SE in the first VPN 50A, to the second VPN 50B. Similarly the inter-VRF multicast packet transmission unit 1131B sends a multicast packet, which is received from the transmission device in the second VPN 50B, to the first VPN 50A. The data packet transmitting/receiving processor 113A corresponds to the transfer module and the transmission device information acquisition module in the claims of the invention. The data packet transmitting/receiving processor 113B corresponds to the multicast packet transmission module and the multicast packet receiving module in the claims of the invention.

The multicast route computation units 114A and 114B compute required information for relaying a multicast packet and set and store multicast route computation tables 1141A and 1141B. Each of the multicast route computation tables 1141A and 1141B stores computed data for relaying a multicast packet with regard to a source and a destination (group). A sender address or source address and a group address or destination address written in an IP header of a received multicast packet are respectively registered as source information and as group information. Each of the multicast route computation tables 1141A and 1141B stores a source address, a multicast group address, and information regarding an input interface and an output interface. The multicast routing protocol processing modules 11A and 11B independently establish the first VPN 50A and the second VPN 50B, so that multicast route computation tables are provided individually for the respective VPNs or VRFs. The multicast route computation table used in this embodiment is provided by adding VRF information of an input interface and of an output interface to a general multicast route computation table provided according to the PIM-SM protocol. The VRF 51A performs multicast relay according to the information stored in the multicast route computation table 1141A, whereas the VRF 51B performs multicast relay according to the information stored in the multicast route computation table 1141B. The multicast route computation table provided for multicast relay in each VRF includes an address of a transmission device in its own VPN as source information, an address of a multicast group which a receiving device in its own VPN participates in as group information, and its own VRF name as an input VRF and as an output VRF. The multicast route computation units 114A and 114B respectively correspond to the first and the second communication route establishment modules in the claims of the invention.

As one example of inter-VRF multicast route computation tables used in the embodiment, the multicast route computation table 1141A used in the VRF 51A is explained with reference to FIG. 3. The multicast route computation table 1141A stores source information representing an address of a transmission device, group information representing an address of a multicast group as an inter-VRF relay subject, IVRF information representing a sender or input VRF name, IIF information representing an input interface, OVRF information representing a receiver or output VRF name, and OIF information representing an output interface. The IVRF information and the OVRF information are set in advance by the user in this embodiment. In the illustrated example of FIG. 3, an address of the transmission device SE, an address of a group 1, the VRF 51A, the interface 102, and the VRF 51B are recorded respectively as the source information, the group information, the IVRF information, the IIF information, and the OVRF information. The OIF information represents information on an output interface in the VRF 51B and is thus recorded after acquisition of the information on the output interface, which connects with the receiving device RE that sends a join request message in the second VPN 50B, from the VRF 51B. The concrete procedure of setting the multicast route computation table will be described later.

The multicast packet relay processing module 13 physically controls multicast packet relay operations via the input/output interfaces included in the network relay router 10. The multicast packet relay processing module 13 has a VRF controller 131 configured to identify a VRF and control multicast packet relay operations via the input/output interfaces. The multicast packet relay processing module 13 is connected with the input/output interfaces 101 through 103 corresponding to the VRF 51A and with the input/output interfaces 104 through 106 corresponding to the VRF 51B.

The VRF information setting module 14 sets and stores a received multicast packet and externally input VRF-related information. The VRF information setting module 14 includes the VRF information 141 regarding the respective input/output interfaces and inter-VRF relay information 142. The VRF information 141 is used to identify which VRF each input/output interface belongs to and represents identification information assigned to each VRF, for example, a VRF name or a VRF ID. The VRF information 141 may be externally set or may be set based on a received multicast packet. The VRF information setting module 14 sets and stores the VRF information 141 on the respective input/output interfaces. Each of the multicast routing protocol processing modules 11A and 11B then identifies the input/output interfaces belonging to its own VRF and allows for multicast communication between the identified input/output interfaces belonging to its own VRF. The inter-VRF relay information 142 includes group information representing an address of a multicast group as an inter-VRF relay subject, IVRF information representing a sender or input VRF, and OVRF information representing a receiver or output VRF. A unique VRF name or VRF ID (identification information) for identifying each VRF is set as the IVRF information or the OVRF information. The inter-VRF relay information 142 is used to relay a multicast packet between multiple different VRFs. The multicast routing protocol processing modules 11A and 11B working in the corresponding VRFs refer to the inter-VRF relay information 142. When its own VRF matches with the VRF name registered as the IVRF information, the multicast routing protocol processing module 11A or 11B sends a PIM(*,G)join message for the multicast group registered as the group information to the rendezvous point of the corresponding VPN. The address of the multicast group is set independently of the combination of VRFs and may be specified either as an individual address or an address range. When receiving devices participating in the multicast group exist in multiple different VPNs, multiple VRFs are registered as the OVRF information. The inter-VRF relay information 142 corresponds to the relay information storage module in the claims of the invention.

The inter-VRF relay information 142 used in this embodiment is further explained with reference to FIG. 4. In the inter-VRF relay information 142 shown in FIG. 4, the address of the group 1, the sender VRF 51A, and the receiver VRF 51B are registered respectively as the group information representing the address of the multicast group as the inter-VRF relay subject, the IVRF information, and the OVRF information. These settings enable a multicast packet with the group 1 as the address of the multicast group to be relayed from the VRF 51A to the VRF 51B. The multicast routing protocol processing modules 11A and 11B working in the corresponding VRFs in the network relay router 10 refer to the inter-VRF relay information 142. When its own VRF matches with the VRF name registered as the IVRF information, the multicast routing protocol processing module 11A or 11B sends a PIM (*,G)join message for the multicast group registered as the group information to the rendezvous point of the corresponding VPN. When receiving devices participating in the multicast group exist in multiple different VPNs, multiple VRFs may be registered as the OVRF information.

The VRF identification module 15 identifies a VRF as a subject of processing a received multicast packet, based on a VRF correspondence table 151. The VRF identification module 15 utilizes the settings of the VRF information of the respective input/output interfaces and creates the VRF correspondence table 151 of unequivocally correlating the input/output interfaces to the VRF. Namely a VRF is unequivocally determinable corresponding to the input/output interface receiving the multicast packet. When the network relay router 10 receives a control packet and a multicast packet via a certain input/output interface, the VRF identification module 15 identifies the VRF corresponding to the certain input/output interface receiving these packets and notifies the control packet transmitting/receiving processor in the identified VRF of the identification result.

The inter-VRF gateway processing module 16 performs multicast packet transfer and makes various inquiries to the multicast routing protocol processing modules 11A and 11B working in the multiple different VRFs. The inter-VRF gateway processing module 16 searches the multicast route computation tables 1141A and 1141B in the sender VRF 51A and the receiver VRF 51B for information on the respective input/output interfaces. The inter-VRF gateway processing module 16 then controls the multicast route computation units 114A and 114B in the sender VRF 51A and in the receiver VRF 51B to update the multicast route computation tables 1141A and 1141B. This enables inter-VRF multicast relay. When a receiving device RE is withdrawn from the multicast group, the inter-VRF gateway processing module 16 searches the multicast route computation tables 1141A and 1141B in the sender VRF 51A and in the receiver VRF 51B and causes the multicast route computation units 114A and 114B in the sender VRF 51A and in the receiver VRF 51B to delete the information on the receiver VRF and the output interface from the multicast route computation tables 1141A and 1141B in the sender VRF 51A and in the receiver VRF 51B. This disables the inter-VRF multicast relay. The inter-VRF gateway processing module 16 and the inter-VRF multicast packet transmission units 1131A and 1131B correspond to the intra-device transmission module in the claims of the invention. The inter-VRF gateway processing module 16 also corresponds to the intra-device route information exchange module in the claims of the invention.

The VRF information setting module 14, the VRF identification module 15, and the VRF managers 111A and 111B of the respective multicast routing protocol processing modules 11A and 11B are provided to independently activate a multicast routing protocol in each VPN.

In the conventional VRF technique, a multicast routing protocol is activated independently in each VPN, and multicast communication is restricted within the same VPN. Multicast communication is not enabled between the different VPNs 50A and 50B, so that a receiving device in the second VPN 50B is not allowed to receive a multicast packet from a transmission device in the first VPN 50A. In the network relay router 10 of the embodiment, the presence of the inter-VRF gateway processing module 16, the storage of the inter-VRF relay information 142 in the VRF information setting module 14, the presence of the inter-VRF join request transmission units 1121A and 1121B in the control packet transmitting/receiving processors 112A and 112B, and the presence of the inter-VRF multicast packet transmission units 1131A and 1131B in the data packet transmitting/receiving processors 113A and 113B enable relay of a multicast packet between different multiple VRFs or VPNs.

Operations of Network Relay Router

<Establishment of Multicast Packet Route in First VPN 50A>

FIG. 5 is an explanatory diagrammatic representation of the flows of control packets and data packets when the network relay router 10 of the embodiment behaves as a PIM-SM router connecting with a receiving device in the first VPN 50A. The operations of the network relay router 10 of the embodiment behaving as the PIM-SOM router connecting with the receiving device in the first VPN 50A are described first. The network relay router 10 of this embodiment utilizes PIM-SM protocol operations of sending a PIM(*,G)join message to the router 30a as the rendezvous point and thereby receiving a multicast packet via the rendezvous point. In the network relay router 10, the multicast routing protocol processing module 11A in the sender VRF 51A refers to the settings of the address of a multicast group (destination address) and the sender VRF name and sequentially sends a join request PIM(*,G)join message (CP1) for the multicast group to the router 30a as the rendezvous point of the first VPN 50A.

In response to transmission of the join request message CP1, the network relay router 10 receives a multicast packet (DP1) relayed via the interface 101 connecting with the rendezvous point. The network relay router 10 acquires the address of the transmission device SE (source address or sender address) from the received multicast packet DP1 and sends a join request PIM(S,G)join message (CP2) via the interface 102 on the side of the transmission device SE. In response to transmission of the join request message CP2, the network relay router 10 receives a multicast packet via the interface 102. This establishes an optimum multicast route (MR) between the transmission device SE or the router 20a in the sender or first VPN 50A and the network relay router 10. When the address of the multicast packet received via the interface 102 matches with the address of the multicast group set as the inter-VRF relay subject in the network relay router 10, the network relay router 10 transfers the received multicast packet to the multicast routing protocol processing module 11B working in the receiver VRF 51B.

Figure 6:
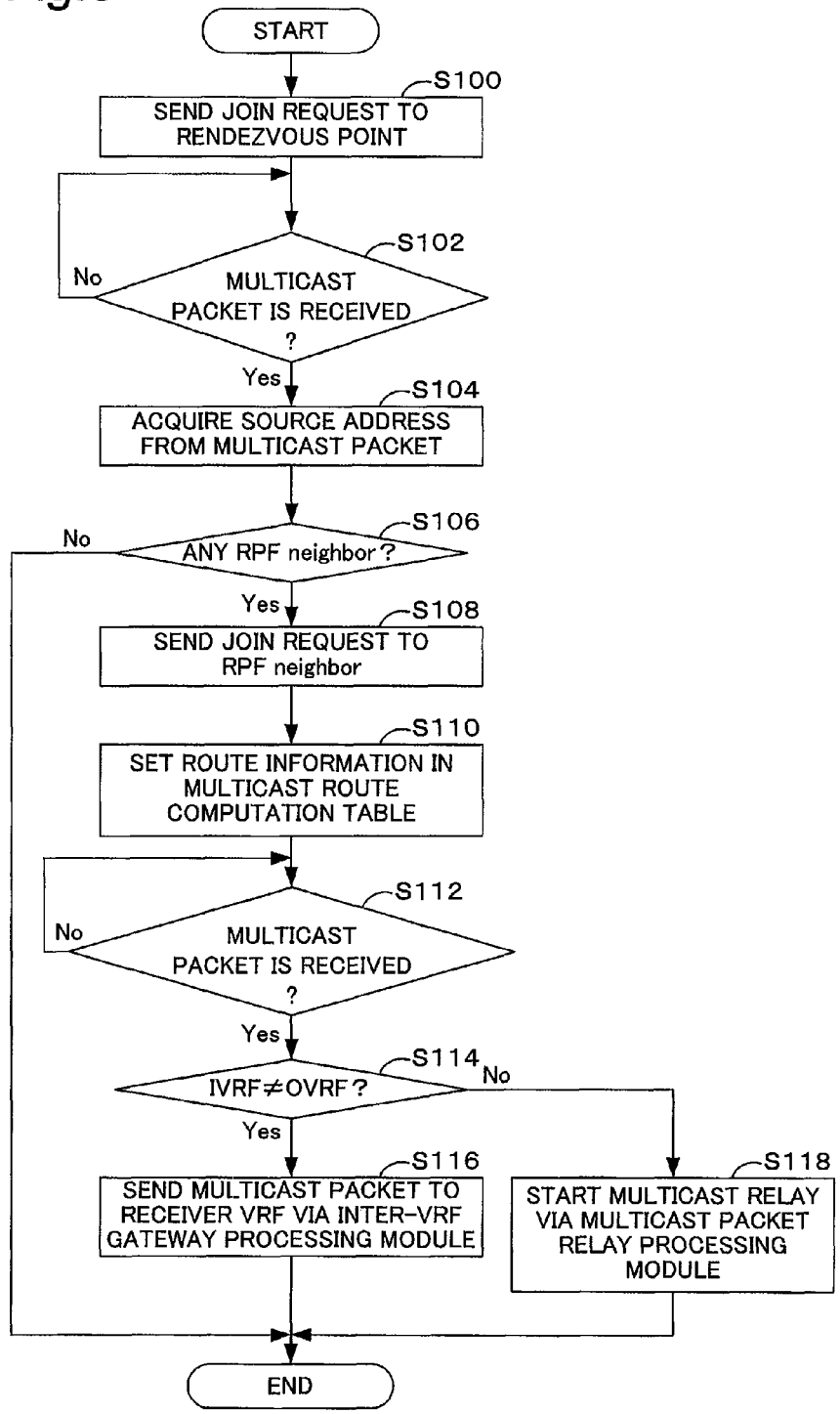
FIG. 6 is a flowchart showing a processing routine for establishing a multicast packet route in the first VPN performed by the network relay router of the embodiment.

The operations of the network relay router 10 are described in detail. FIG. 6 is a flowchart showing a processing routine for establishing a multicast packet route in the first VPN 50 performed by the network relay router 10 of the embodiment.

Figures 7, 8:
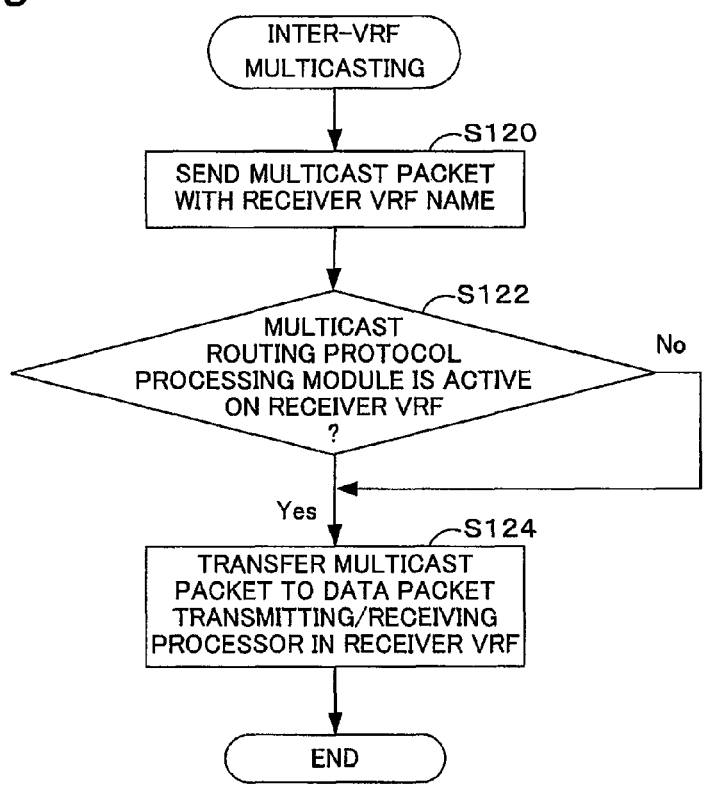
FIG. 7 is a flowchart showing a processing routine of inter-VRF multicast relay performed by the network relay router of the embodiment.
FIG. 8 is an explanatory diagrammatic representation of a multicast route computation table stored in a sender VRF after transfer of a multicast packet to a receiver VRF.

FIG. 7 is a flowchart showing a processing routine of inter-VRF multicast relay performed by the network relay router 10 of the embodiment.

The processing routine for establishing the multicast packet route in the first VPN 50A is performed repeatedly at preset time intervals. The inter-VRF join request transmission unit 1121A sends a join request PIM(*,G)join message for a multicast group set in advance in the inter-VRF relay information 142 to the router 30a as the rendezvous point via the interface 101 connecting with the router 30a (step S100). At this stage, the VRF manager 111A stores therein inter-VRF relay information (multicast group address and receiver VRF name) used for transmission of the join request. The data packet transmitting/receiving processor 113A waits for reception of a multicast packet from the router 30a as the rendezvous point (step S102: No). When receiving a multicast packet (step S102: Yes), the data packet transmitting/receiving processor 113A acquires the address of the transmission device SE (source address) from the received multicast packet (step S104).

The control packet transmitting/receiving processor 112A searches for any adjacent router RPF neighbor with the acquired source address (step S106). In response to detection of any adjacent router (step S106: Yes), the control packet transmitting/receiving processor 112A sends a join request (PIM(S,G)join message with the specified source address to the detected adjacent router (step S108). The search for the adjacent router may be performed by sending a PIM-Hello message or by referring to a routing table provided in the network relay router 10. When the control packet transmitting/receiving processor 112A does not detect any adjacent router (step S106: No), the network relay router 10 terminates this processing routine without establishing a shortest multicast route. After transmission of the join request message to the retrieved adjacent router, the multicast route computation unit 114A sets route information into the multicast route computation table 1141A as shown in FIG. 3 (step S110). Specifically the multicast route computation unit 114A sets the source information, the group information, the IVRF information, the IIF information, the OVRF information, and the OIF information in the multicast route computation table 1141A. The source address and the multicast group address used for transmission of the join request are set respectively as the source information and as the group information. The own VRF name and the input interface used for transmission of the join request to the adjacent router are set respectively as the IVRF information and as the IFF information. The receiver VRF name stored in the VRF manager 111A at step S100 is set as the OVRF information. Specifically the multicast route computation unit 114A searches the inter-VRF relay information stored in the VRF manager 111A for any entry corresponding to the multicast group address used for transmission of the join request, and registers the receiver VRF name included in the corresponding entry as the OVRF information. At this stage, the multicast packet relay processing module 13 has not yet been notified of the information registered in the multicast route computation table 1141A, so that multicast packets are continuously sent to the data packet transmitting/receiving processor 113A.

The data packet transmitting/receiving processor 113A waits for reception of a multicast packet from the transmission device SE via the detected adjacent router (step S112: No). When the data packet transmitting/receiving processor 113A receives a multicast packet (step S112: Yes), the multicast route computation unit 114A searches the multicast route computation table 1141A for any entry with the source information and the group information of the received multicast packet and determines whether any other VRF name is registered as the OVRF information in the retrieved entry of the multicast route computation table 1141A (step S114). When the retrieved entry of the multicast route computation table 1141A includes the registry of another VRF name as the OVRF information (step S114: Yes), the multicast route computation unit 114A sends the received multicast packet to the receiver VRF 51B via the inter-VIR gateway processing module 16 (step S116). The network relay router 10 then terminates this processing routine. Specifically the multicast route computation unit 114A notifies the inter-VRF gateway processing module 16 of the receiver VRF name, accompanied with transmission of the received multicast packet. The inter-VRF gateway processing module 16 transfers the multicast packet to the data packet transmitting/receiving processor 113B of the multicast routing protocol processing module 11B working in the receiver VRF 51B, based on the notified receiver VRF name.

FIG. 8 is an explanatory diagrammatic representation of the multicast route computation table 1141A stored in the sender VRF 51A after transfer of a multicast packet to the receiver VRF 51B. In the multicast route computation table 1141A, an address 'Server1_Addr' of the transmission device SE and an address 'Group1_Addr' of the multicast group set in advance as the inter-VRF relay subject in the network relay router 10 are respectively registered as the source information and as the group information. A sender VRF name 'VRF 51A' including the transmission device SE, an input interface 'IF102' in the VRF 51A receiving the multicast packet from the transmission device SE, and a receiver VRF name 'VRF 51B' set in advance in the network relay router 10 are respectively registered as the IVRF information, the IFF information, and the OVRF information. At this stage of transferring the multicast packet from the VRF 51A to the VRF 51B, there is no registry of the OIF information, since the sender VRF 51A has not yet acquired the information on the output interface in the receiver VRF 51B.

When the OVRF information in the retrieved entry of the multicast route computation table 1141A matches with the own VRF name (step S114: No), on the other hand, the multicast route computation unit 114A performs multicast relay in its own VPN 50A via the multicast packet relay processing module 13 (step S118). Specifically the multicast route computation unit 114A notifies the multicast packet relay processing module 13 of the information registered in the updated multicast route computation table 1141A, so as to start multicast relay in its own VPN 50A.

The process of transferring the multicast packet received from the VRF 51A to the multicast routing protocol processing module 11B working in the different VRF 51B via the inter-VRF gateway processing module 16 is described in detail with reference to the flowchart of FIG. 7. When receiving a multicast packet from the detected adjacent router, the multicast route computation unit 114A notifies the inter-VRF gateway processing module 16 of the receiver VRF name accompanied with transmission of the received multicast packet and makes a request for inter-VRF transfer (step S120). The inter-VRF gateway processing module 16 determines whether the multicast routing protocol is active on the receiver VRF 51B specified by the notified receiver VRF name as an output destination (step S122). Specifically the inter-VRF gateway processing module 16 searches the VRF information 141 stored in the VRF information setting module 14 for any record of the VRF information corresponding to the receiver VRF name. As mentioned previously, the VRF information 141 has records of active VRFs in the network relay router 10. When it is determined that the VRF 51B matching with the receiver VRF name is active (step S122: Yes), the inter-VRF gateway processing module 16 transfers the received multicast packet to the data packet transmitting/receiving processor 113B of the multicast routing protocol processing module 11B working in the receiver VRF 51B (step S124). The network relay router 10 then exits from this processing routine. When it is determined that the VRF 51B matching with the receiver VRF name is inactive (step S122: No), on the other hand, the network relay router 10 exits from this processing routine without transfer of the received multicast packet via the inter-VRF gateway processing module 16.

<Establishment of Multicast Packet Route in Second VPN 50B>

Figure 9:
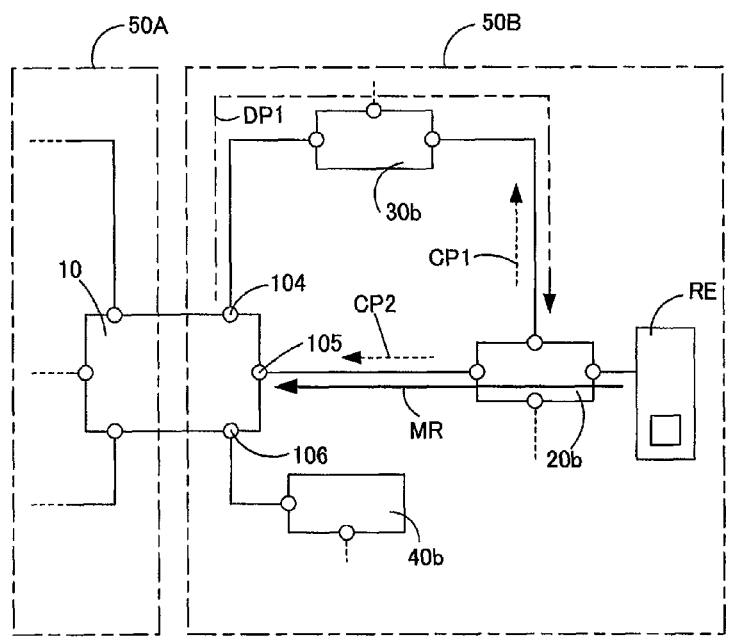
FIG. 9 is an explanatory diagrammatic representation of the flows of control packets and data packets when the network relay router of the embodiment behaves as a PIM-SM router connecting with a transmission device in a second VPN.

FIG. 9 is an explanatory diagrammatic representation of the flows of control packets and data packets when the network relay router 10 of the embodiment behaves as a PIM-SM router connecting with a transmission device in the second VPN 50B. When receiving a Report message from the receiving device RE, the router 20b sends a join request PIM(*,G) join message (CP1) to the router 30b as the rendezvous point according to the PIM-SM protocol. The multicast routing protocol processing module 11B working in the VRF 51B of the network relay router 10 behaves as if a multicast packet actually transferred from the VRF 51A were received from a directly connecting transmission device and thereby relays the received multicast packet (DP1) to the router 30b as the rendezvous point in the VRF 51B according to the general PIM-SM protocol. After the router 30b receives the join request PIM(*,G)join message (CP1) from the router 20b, the multicast packet (DP1) relayed to the router 30b as the rendezvous point is further relayed to the router 20b according to the PIM-SM protocol. The router 20b acquires the source address of the transmission device SE from the relayed multicast packet, refers to unicast routing information based on the acquired source address, and computes an adjacent router RPF Neighbor for establishing a shortest route. The router 20b sends a join request PIM(S,G)join message (CP2) via the interface 105 connecting with the computed adjacent router to establish an optimum multicast router (MR) in the second VPN 50B. The unicast routing information includes registry of a transmission device belong to a different VPN.

Figure 10:
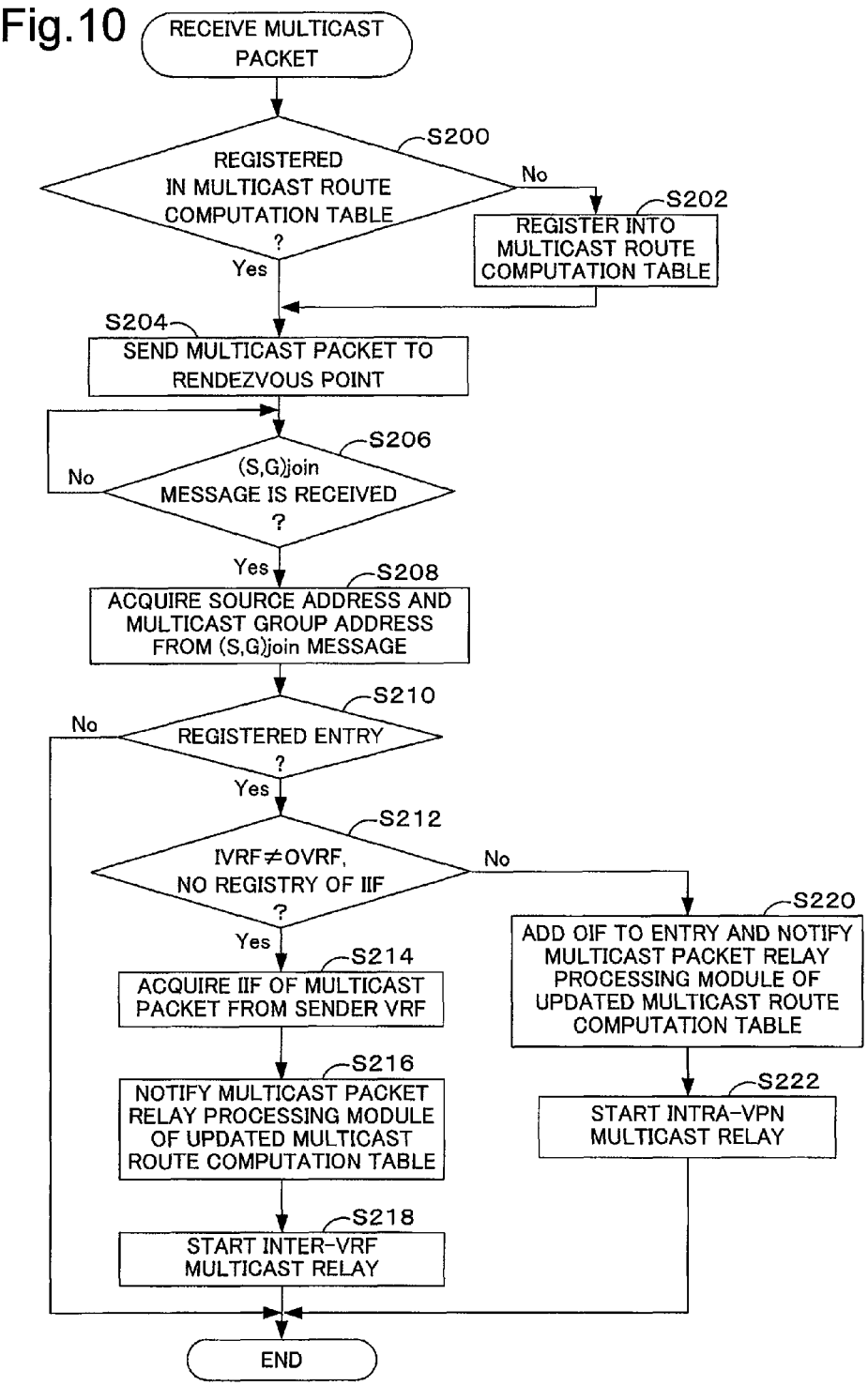
FIG. 10 is a flowchart showing a processing routine for establishing a multicast packet route in the second VPN performed by the network relay router of the embodiment.
Figure 11:
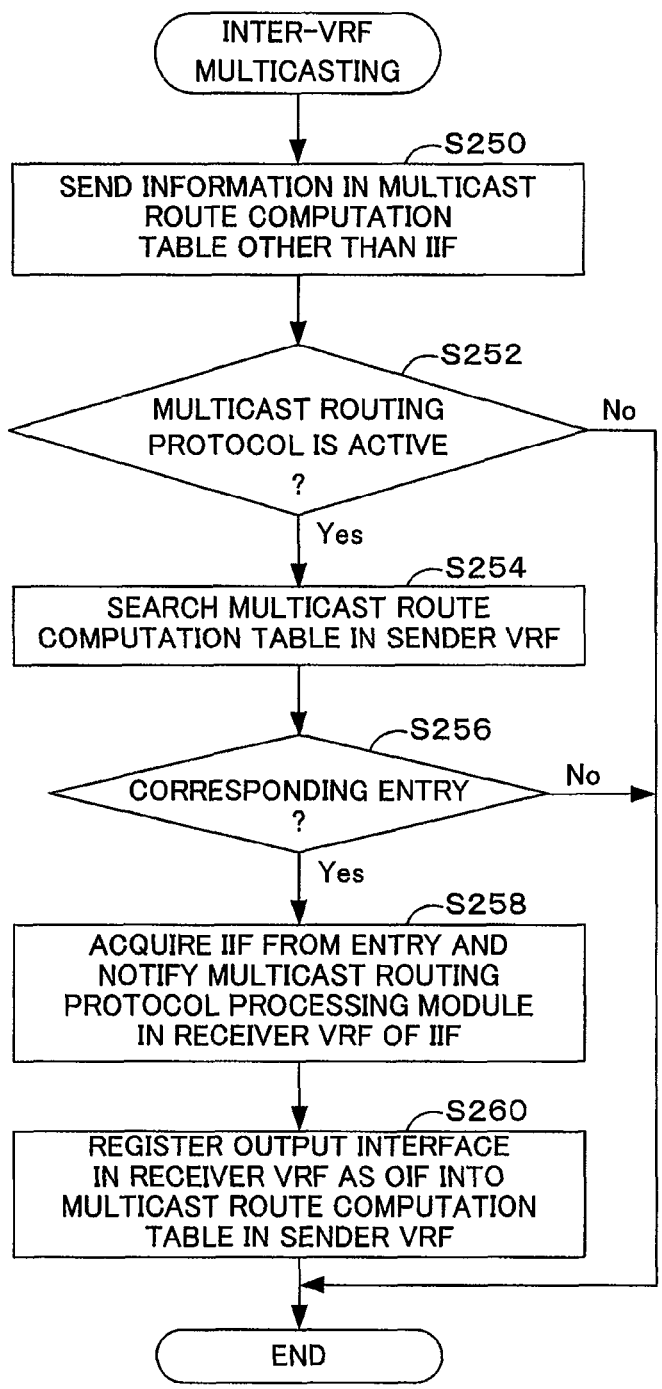
FIG. 11 is a flowchart showing a processing routine of inter-VRF multicast relay performed by the network relay router of the embodiment.

Multicast relay processing in the second VPN 50B including the receiving device RE is described below in detail. FIG. 10 is a flowchart showing a processing routine for establishing a multicast packet route in the second VPN 50B performed by the network relay router 10 of the embodiment. FIG. 11 is a flowchart showing a processing routine of inter-VRF multicast relay performed by the network relay router 10 of the embodiment. The processing routine of FIG. 10 is triggered by reception of a multicast packet into the VRF 51B (the multicast routing protocol processing module 11B).

The multicast routing protocol processing module 11B determines whether a source address and a multicast group address of a received multicast packet have already been registered in the multicast route computation table 1141B (step S200). Specifically the multicast routing protocol processing module 11B searches the multicast route computation table 1141B for any entry corresponding to the source address and the multicast group address of the received multicast packet. When a multicast packet is received from the inter-VRF multicast packet transmission unit 1131A in the VRF 51A for the first time, there is no corresponding entry registered in the multicast route computation table 1141B. In the same manner as the processing of a multicast packet received from a directly connecting transmission device SE, the multicast routing protocol processing module 11B registers the information of the multicast packet, which is received from the inter-VRF multicast packet transmission unit 1131A in the VRF 51A, into the multicast route computation table 1141B and relays the received multicast packet to the router 30b as the rendezvous point. When there is no entry corresponding to the source address and the multicast group address of the received multicast packet in the multicast route computation table 1141B (step S200: No), the multicast routing protocol processing module 11B registers the information of the received multicast packet into the multicast route computation table 1141B (step S202). Specifically the multicast routing protocol processing module 11B registers the source information, the group information, the IVRF information, the IIF information, the OVRF information, and the OIF information in the multicast route computation table 1141B and notifies the multicast packet relay processing module 13 of the information registered in the multicast route computation table 1141B. When a multicast packet is received from another VRF, a sender VRF name, a receiver VRF name, and an interface connecting with the rendezvous point are registered respectively as the IVRF information, the OVRF information, and the OIF information in the multicast route computation table 1141B. Identification of the multicast packet received from another VRF may be based on the result of determination of whether the interface receiving the multicast packet corresponds to its own VRF. At this stage, there is no registry of the IIF information, since the receiver VRF 51B has not yet acquired the information on the input interface in the sender VRF 51A. When a multicast packet is received from a transmission device directly connecting with the multicast routing protocol processing module 11B working in the VRF 51B, on the other hand, its own VRF name, a receiver VRF name, an interface connecting with the rendezvous point, and an interface connecting with the transmission device and receiving the multicast packet are registered respectively as the IVRF information, the OVRF information, the OIF information, and the IFF information in the multicast route computation table 1141B. When a received multicast packet has a receiver VRF name identical with a sender VRF name, the multicast routing protocol processing module 11B notifies the multicast packet relay processing module 13 of the fact. In this case, a VRF name with a transmission device, its own VRF name or a VRF name with a receiving device, and an interface connecting with the rendezvous point are registered respectively as the IVRF information, the OVRF information and the OIF information in the multicast route computation table 1141B. There is no registry of the IIF information, since the input interface is unknown at this stage. A source address and a multicast group address acquired from the received multicast packet are registered respectively as the source information and the group information. The router 20b connecting with the receiving device RE sends a join request PIM(S,G)join message with the source address of the multicast packet received via the rendezvous point. The network relay router 10 receives the PIM(S,G)join message via the interface 105.

The data packet transmitting/receiving processor 113B sends the received multicast packet to the router 30b as the rendezvous point (step S204). The control packet transmitting/receiving processor 112B waits for reception of a join request PIM(S,G)join message from any interface (step S206: No). When receiving a join request PIM(S,G)join message from any interface (step S206: Yes), the control packet transmitting/receiving processor 112B acquires a multicast group address and a source address from the received join request PIM(S,G)join message (step S208). Specifically the multicast packet relay processing module 13 sends a join request PIM(S,G)join message received from any interface to the control packet transmitting/receiving processor 112B in the VRF 51B via the VRF identification module 15. The multicast route computation unit 114B searches the multicast route computation table 1141B for any entry corresponding to the acquired multicast group address and source address. When there is no entry corresponding to the multicast group address of the join request PIM(S,G)join message (step S210: No), the network relay router 10 terminates the processing routine without addition of any information to the multicast route computation table 1141B. When there is any entry corresponding to the multicast group address of the join request PIM(S,G)join message (step S210: Yes), on the other hand, the multicast route computation unit 114B adds an output interface on the side of the receiving device RE as the OIF information to the corresponding entry in the multicast route computation table 1141B. The multicast route computation unit 114B then determines whether the entry has different OVRF information and IVRF information and has no registry of the IIF information (step S212). For inter-VRF relay of a received multicast packet, when the received multicast packet has different sender VRF name and receiver VRF name and has no registry of the input interface, it is required to acquire information on the input interface receiving the multicast packet in the sender VRF 51A (that is, an input interface seen from the receiver VRF 51B) via the inter-VRF gateway processing module 16.

When the entry has different OVRF information and IVRF information and has no registry of the IIF information (step S212: Yes), the multicast route computation unit 114B makes a request for acquisition of the IIF information representing the input interface in the sender VRF 51A to the inter-VRF gateway processing module 16. Accompanied with this request, the inter-VRF gateway processing module 16 is notified of the source address, the multicast group address, the sender VRF name, the receiver VRF name, and the output interface in the receiver VRF 51B. The inter-VRF gateway processing module 16 searches the sender VRF 51A to acquire the IFF information of the received multicast packet (step S214). Specifically the inter-VRF gateway processing module 16 searches the multicast route computation table 1141A in the sender VRF 51A for any entry having the source address, the multicast group address, and the receiver VRF name as the OVRF information and acquires the IIF information representing the input interface in the sender VRF from the entry. The multicast route computation unit 114B registers the input interface in the sender VRF 51A, which is acquired by the inter-VRF gateway processing module 16, as IIF information into the corresponding entry in the multicast route computation table 1141B, and adds the name of an interface receiving the PIM(S,G)join message as OIF information to the corresponding entry. The multicast route computation unit 114B subsequently notifies the multicast packet relay processing module 13 of the updated multicast route computation table 1141B (step S216). The multicast packet relay processing module 13 then starts multicast relay across the notified inter-VPN shortest route (step S218). The network relay router 10 here terminates this processing routine. After notification of the established shortest route to the multicast packet relay processing module 13, the multicast packet relay processing module 13 starts relay of the multicast packet without notification to the data packet transmitting/receiving processors 113A and 113B in the respective VRFs 51A and 51B.

When the entry has identical OVRF information and IVRF information (step S212: No), the multicast route computation unit 114B adds the name of an interface receiving the PIM(S, G)join message as OIF information to the entry and notifies the multicast packet relay processing module 13 of the updated multicast route computation table 1141B (step S220). Intra-VPN multicast relay then starts to send the multicast packet via the interface receiving the PIM(S,G)join message (step S222). The network relay router 10 here terminates this processing routine.

The process of registering the interface information in the other VRF 51A as the IIF information into the multicast route computation table 1141B via the inter-VRF gateway processing module 16 after reception of the PIM(S,G)join message in the VRF 51B is described in detail with reference to the flowchart of FIG. 11. FIG. 12 is an explanatory diagrammatic representation of the multicast route computation table 1141B stored in the receiver VRF 51B after reception of the PIM(S,G)join message. In the multicast route computation table 1141B, the address 'Server1_Addr' of the transmission device SE and the address 'Group1_Addr' of the multicast group transferred from the VRF 51A are respectively registered as the source information and as the group information. The sender VRF name 'VRF 51A' including the transmission device SE, the receiver VRF name 'VRF 51B', and the output interface 105 in the receiver VRF 51B are respectively registered as the IVRF information, the OVRF information, and the OIF information. At this stage of receiving the PIM(S,G) join message, there is no registry of the IIF information, since the receiver VRF 51B has not yet acquired the information on the input interface in the sender VRF 51A.

The multicast route computation unit 114B notifies the inter-VRF gateway processing module 16 of the source address, the multicast group address, the sender VRF name, the receiver VRF name, and the output interface in the receiver VRF 51B and makes a request for acquiring the information on the input interface in the sender VRF 51A (step S250). The inter-VRF gateway processing module 16 determines whether the multicast routing protocol is active on the sender VRF 51A specified by the notified sender VRF name as an input source (step S252). Specifically the inter-VRF gateway processing module 16 searches the VRF information 141 stored in the VRF information setting module 14 for any record of the VRF information corresponding to the sender VRF name. As mentioned previously, the VRF information 141 has records of active VRFs in the network relay router 10. When it is determined that the VRF 51A matching with the sender VRF name is active, the inter-VRF gateway processing module 16 determines that the multicast routing protocol is active on the sender VRF 51A as the input source (step S252: Yes). The inter-VRF gateway processing module 16 subsequently searches the multicast route computation table 1141A in the sender VRF 51A for any entry corresponding to the notified source address and multicast group address (step S254). When it is determined that the multicast routing protocol is inactive on the sender VRF 51A (step S252: No), on the other hand, the network relay router 10 exits from this processing routine without acquisition of the IIF information via the inter-VRF gateway processing module 16.

When there is any corresponding entry in the multicast route computation table 1141A (step S256: Yes), the inter-VRF gateway processing module 16 acquires the input interface name registered as the IIF information of the corresponding entry and notifies the multicast routing protocol processing module 11B in the receiver VRF 51B of the acquired input interface name (step S258). The multicast route computation unit 114B registers the notified name of the input interface in the sender VRF 51A as the IIF information into a corresponding entry in the multicast route computation table 1141B in the receiver VRF 51B. The multicast route computation unit 114A in the sender VRF 51A adds the information on the output interface in the receiver VRF 51B received from the inter-VRF gateway processing module 16 as the OIF information to the retrieved entry corresponding to the source address and the multicast group address in the multicast route computation table 1141A. The network relay router 10 then exits from this processing routine. When there is no corresponding entry in the multicast router computation table 1141A (step S256: No), on the other hand, the network relay router 10 exits from this processing routine without acquisition of the IIF information via the inter-VRF gateway processing module 16.

FIG. 13 is an explanatory diagrammatic representation of the multicast route computation table 1141B stored in the receiver VRF 51B after acquisition of the IIF information. In the multicast route computation table 1141B, the address 'Server1_Addr' of the transmission device SE and the address 'Group1_Addr' of the multicast group transferred from the VRF 51A are respectively registered as the source information and as the group information. The sender VRF name 'VRF 51A' including the transmission device SE, the receiver VRF name 'VRF 51B', the output interface 105 in the receiver VRF 51B, and the input interface 102 in the sender VRF 51A acquired from the multicast routing protocol processing module 11A in the sender VRF 51A are respectively registered as the IVRF information, the OVRF information, the OIF information, and the IIF information.

FIG. 14 is an explanatory diagrammatic representation of the multicast route computation table 1141A stored in the sender VRF 51A after addition of the OIF information. In the multicast route computation table 1141A, the address 'Server1_Addr' of the transmission device SE and the address 'Group1_Addr' of the multicast group set in advance as the inter-VRF relay subject in the network relay router 10 are respectively registered as the source information and as the group information. The sender VRF name 'VRF 51A' including the transmission device SE, the input interface 102 in the VRF 51A receiving the multicast packet from the transmission device SE, the receiver VRF name 'VRF 51B' set in advance in the network relay router 10, and the output interface 105 received by the request from the inter-VRF gateway processing module 16 are respectively registered as the IVRF information, the IFF information, the OVRF information, and the OIF information.

Withdrawal of Receiving Device from Multicast Group

The receiving device RE sends a Leave message to the router 20b, in order to withdraw from the participating multicast group. In response to reception of the Leave message, the router 20b sends a PIM(S,G)prune message to the network relay router 10 according to the PIM-SM protocol. The network relay router 10 disables relay of a multicast packet via an interface receiving the PIM(S,G)prune message as described below in detail.

Figure 15:
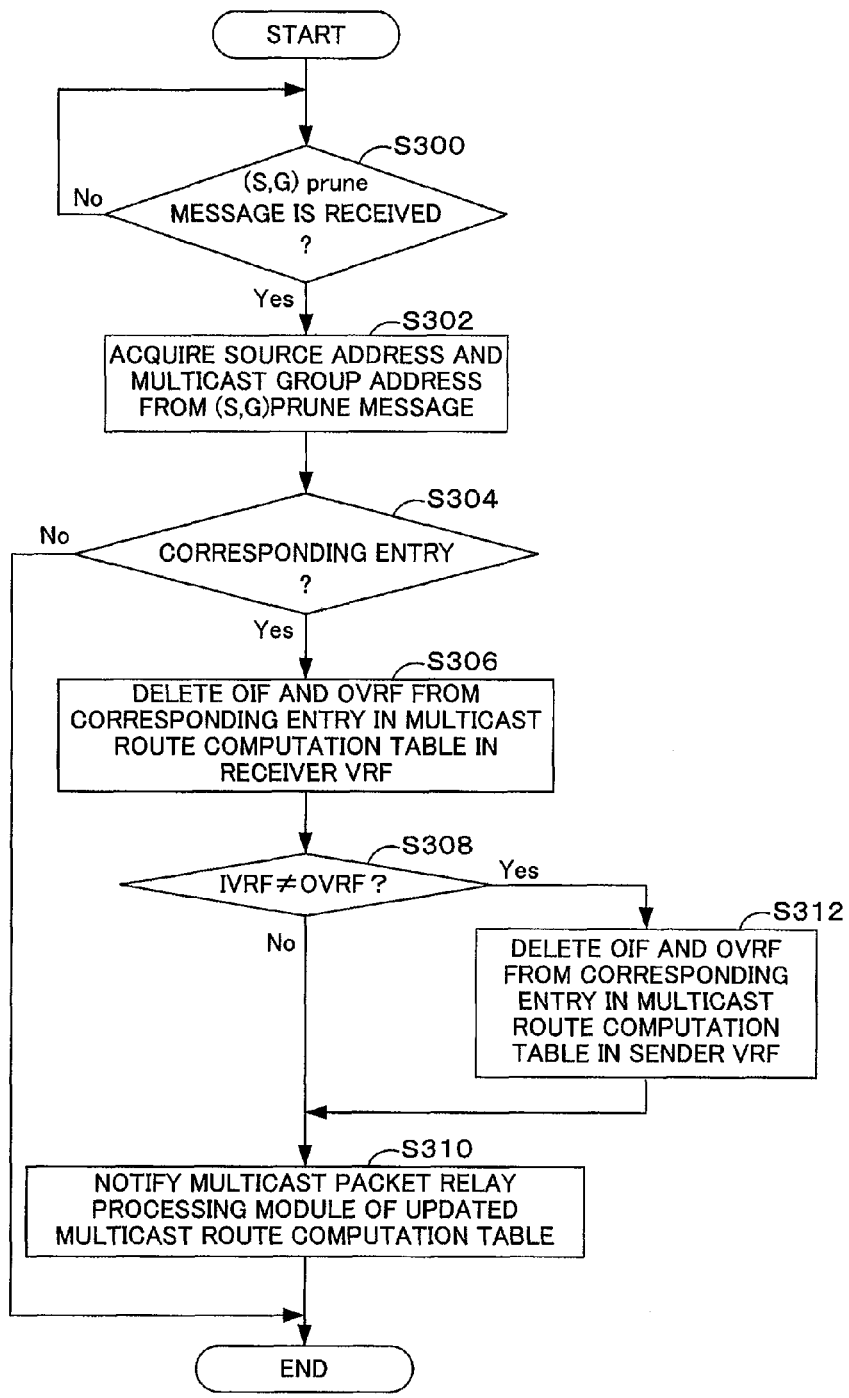
FIG. 15 is a flowchart showing a processing routine performed by the network relay router of the embodiment to stop transmission of a multicast packet in response to reception of a PIM(S,G)prune message.

FIG. 15 is a flowchart showing a processing routine performed by the network relay router 10 of the embodiment to stop transmission of a multicast packet in response to reception of a PIM(S,G)prune message. This routine does not proceed until the multicast routing protocol processing module 11B working in the receiver VRF 51B receives a PIM(S, G)prune message from the router 20b connecting with the receiving device RE (step S300: No). When the multicast routing protocol processing module 11B receives a PIM(S, G)prune message via the interface 105 connecting with the router 20b (step S300: Yes), the control packet transmitting/receiving processor 112B acquires a source address and a multicast group address from the received PIM(S,G)prune message (step S302). The multicast route computation unit 114B searches the multicast route computation table 1141B for any entry corresponding to the acquired source address and multicast group address (step S304). When where is any corresponding entry (step S304: Yes), the multicast route computation unit 114B deletes the output interface and the receiver VRF name registered as the OIF information and the OVRF information from the corresponding entry in the multicast route computation table 1141B and notifies the multicast packet relay processing module 13 of the updated multicast route computation table 1141B (step S306).

The multicast route computation unit 114B subsequently determines whether the IVRF information set in the multicast route computation table 1141B is different from its own VRF (step S308). This determines whether the corresponding entry has different registries of the sender VRF and the receiver VRF as the IVRF information and the OVRF information and is used for inter-VRF multicast relay. When the registry of the IVRF information is different from the registry of the OVRF information (step S308: Yes), the multicast route computation unit 114B notifies the inter-VRF gateway processing module 16 of the source address, the multicast group address, the sender VRF name, the receiver VRF name, and the output interface in the receiver VRF 51B of the corresponding entry and makes a request to delete the OVRF information and the OIF information from a corresponding entry in the multicast route computation table 1141A in the sender VRF 51A (step S312). The multicast route computation unit 114B notifies the multicast packet relay processing module 13 of the updated multicast route computation table 1141B (step S310). The network relay router 10 here terminates this processing routine. The multicast packet relay processing module 13 performs multicast relay based on the notified information in the multicast route computation table 1141B and accordingly disables multicast relay to the output interface deleted from the corresponding entry. When the registry of the IVRF information is identical with the registry of the OVRF information (step S308: No), the multicast route computation unit 114B notifies the multicast packet relay processing module 13 of the updated multicast route computation table 1141B (step S310).

When there is no corresponding entry as the result of the search by the multicast route computation unit 114B (step S304: No), the network relay router 10 terminates this processing routine.

Figure 16:
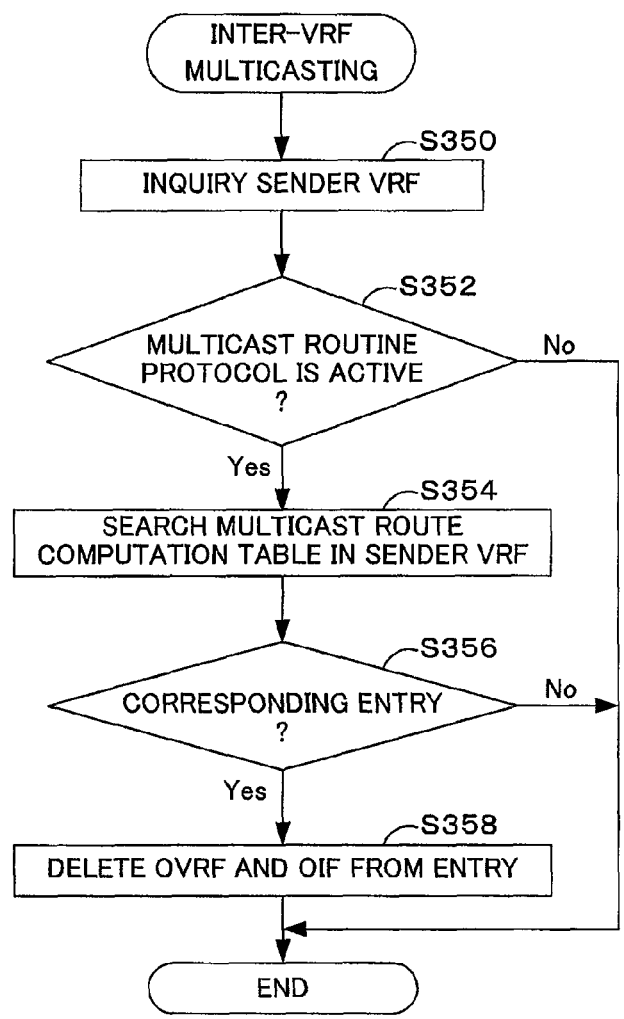
FIG. 16 is a flowchart showing a processing routine performed by the network relay router of the embodiment to delete OVRF information and OIF information of a withdrawn receiving device from the multicast route computation table stored in the sender VRF after reception of the PIM(S,G)prune message.

FIG. 16 is a flowchart showing a processing routine performed by the network relay router 10 of the embodiment to delete the OVRF information and the OIF information of the withdrawn receiving device RE from the multicast route computation table 1141A stored in the sender VRF 51A after reception of the PIM(S,G)prune message. When the multicast route computation table 1141B has any entry corresponding to the multicast group address acquired from the received PIM(S,G) prune message and different IVRF information and OVRF information, the multicast route computation unit 114B notifies the inter-VRF gateway processing module 16 of the source address, the multicast group address, the sender VRF name as the IVRF information, the receiver VRF name as the OVRF information, and the output interface in the receiver VRF 51B as the OIF information of the corresponding entry and makes a request to delete the OVRF information and the OIF information from a corresponding entry in the multicast route computation table 1141A in the sender VRF 51A. In response to this request, the inter-VRF gateway processing module 16 makes an inquiry with the notified sender VRF name to the multicast routing protocol processing module 11A working in the sender VRF 51A (step S350). The inter-VRF gateway processing module 16 determines whether the multicast routing protocol is active on the sender VRF 51A, that is, whether the multicast routing protocol processing module 11A in the sender VRF 51A is activated (step S352). When the multicast routing protocol processing module 11A is not activated (step S352: No), the network relay router 10 exits from this processing routine without deletion of the OVRF information and the OIF information via the inter-VRF gateway processing module 16. The inter-VRF gateway processing module 16 identifies whether the multicast routing protocol is active or inactive, based on the VRF information 141 as described previously. When the multicast routing protocol processing module 11A is activated (step S352: Yes), the inter-VRF gateway processing module 16 searches the multicast route computation table 1141A in the sender VRF 51A for any entry corresponding to the notified source address and multicast group address (step S354). When there is any corresponding entry in the multicast route computation table 1141A (step S356: Yes), the inter-VRF gateway processing module 16 causes the multicast route computation unit 114A to delete the receiver VRF as the OVRF information and the output interface in the receiver VRF 51B as the OIF information from the corresponding entry in the multicast route computation table 1141A (step S358). The network relay routine 10 here exits from this processing routine. When there is no corresponding entry (step S356: No), on the other hand, the network relay router 10 exits from this processing routine without deletion of the OVRF information and the OIF information via the inter-VRF gateway processing module 16.

FIG. 17 is an explanatory diagrammatic representation of the multicast route computation table 1141B stored in the receiver VRF 51B before reception of the PIM(S,G) prune message. In the multicast route computation table 1141B, the address 'Server1_Addr' of the transmission device SE and the address 'Group1_Addr' of the multicast group transferred from the VRF 51A are respectively registered as the source information and as the group information. The sender VRF name 'VRF 51A' including the transmission device SE, the input interface 102, the receiver VRF name 'VRF 51B', the receiver VRF name 'VRF 51B' including the receiving device RE, and the output interface 105 are respectively registered as the IVRF information, the IFF information, the OVRF information, and the OIF information.

FIG. 18 is an explanatory diagrammatic representation of the multicast route computation table 1141B stored in the receiver VRF 51B after reception of the PIM(S,G) prune message via the interface 105. In the multicast route computation table 1141B, the address 'Server1_Addr' of the transmission device SE and the address 'Group1_Addr' of the multicast group transferred from the VRF 51A are respectively registered as the source information and as the group information. The sender VRF name 'VRF 51A' including the transmission device SE and the input interface 102 are respectively registered as the IVRF information and the IFF information. The receiver VRF name 'VRF 51B' and the output interface 105 are deleted from the OVRF information and the OIF information.

FIG. 19 is an explanatory diagrammatic representation of the multicast route computation table 1141A stored in the sender VRF 51A after reception of the PIM(S,G) prune message via the interface 105. In the multicast route computation table 1141A, the address 'Server1_Addr' of the transmission device SE and the address 'Group1_Addr' of the multicast group set in advance as the inter-VRF relay subject in the network relay router 10 are respectively registered as the source information and as the group information. The sender VRF name 'VRF 51A' including the transmission device SE and the input interface 102 are respectively registered as the IVRF information and the IFF information. The receiver VRF name 'VRF 51B' and the output interface 105 are deleted from the OVRF information and the OIF information.

As described above, the network relay router 10 of the first embodiment behaves as the receiving device in the first VPN 50A to identify the transmission device SE and establish a shortest route to the transmission device SE. The network relay router 10 of the first embodiment behaves as the transmission device in the second VPN 50B. The network relay router 10 of the embodiment thus readily implements multicast communication between multiple different networks with multiple transmission devices.

The network relay router 10 of the first embodiment behaves as the receiving device in the first VPN 50A and as the transmission device in the second VPN 50B and is thus applicable to an existing network in conformity with the PIM-SM protocol without requiring modification of the network configuration. In the network relay router 10 of the first embodiment establishing the multiple VPNs, a shortest communication route is established between the transmission device SE and the network relay router 10 in one VRF according to the PIM-SM protocol by taking advantage of the multicast group specified as the inter-VRF relay subject. A multicast packet is then relayed from the transmission device SE to the network relay router 10 across the established shortest communication route. The multicast packet is then relayed through the network relay router 10 to the other VRF including the receiving device RE and is further relayed to the receiving device RE in the other VRF according to the PIM-SM protocol. The network relay router 10 of the embodiment utilizes the multicast group specified as the inter-VRF relay subject to readily enable inter-network relay of the multicast packet without requiring any modification of the existing protocol.

The information on the multicast group specified as the inter-VRF relay subject is set in the network relay router 10 establishing the multiple VPNs, the first VPN 50A and the second VPN 50B. This enables inter-VRF multicast relay. Namely the inter-VRF multicast relay is implemented by using the multicast group as the search key. Plural multicast groups may be set as the inter-VRF relay subject. Such setting allows for multicast relay between multiple different VPNs with multiple receiving devices and transmission devices. The PIM-SM protocol is used as the multicast routing protocol. This allows for inter-VRF multicast relay even when multiple transmission devices are present in one VPN. The network relay router 10 of the embodiment implements inter-VRN multicast relay with assuring the security in each VPN without requiring the information sharing or the configuration change, which is required for application of a new protocol, such as MSDP.

Second Embodiment

Inter-VRF multicast relay in a network configuration where a transmission device SE and a receiving device RE of multicast packets are directly connected to a network relay router 10 establishing multiple VPNs is described as a second embodiment according to the invention. The network relay router 10 of the second embodiment has the same internal structure as that of the network relay router 10 of the first embodiment. The like components are expressed by the like numerals and symbols and are not specifically described here.

Figures 20, 21, 22:
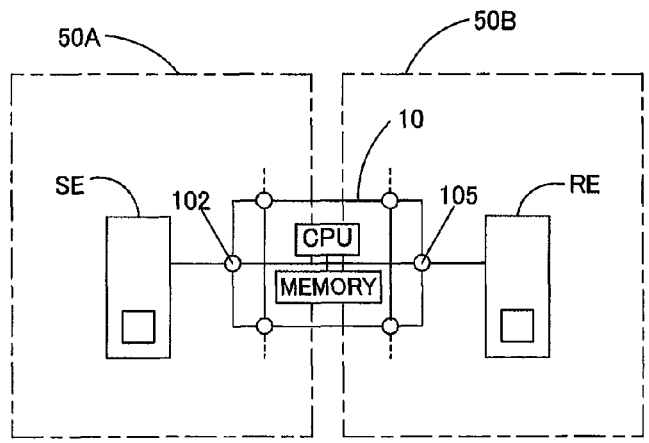
FIG. 20 is an explanatory diagrammatic representation of a network configuration according to a second embodiment of the invention where a transmission device and a receiving device of multicast packets are directly connected to a network relay router establishing multiple VPNs (virtual private networks)
FIG. 21 is an explanatory diagrammatic representation of a multicast route computation table stored in a sender VRF of the second embodiment.
FIG. 22 is an explanatory diagrammatic representation of a multicast route computation table stored in a receiver VRF of the second embodiment.

FIG. 20 is an explanatory diagrammatic representation of the network configuration where the transmission device SE and the receiving device RE of multicast packets are directly connected to the network relay router 10 establishing the multiple VPNs (virtual private networks). The transmission device SE in a first VPN 50A as a first network and the receiving device RE in a second VPN 50B as a second network are connected respectively to an input/output interface 102 and to an input/output interface 105 of the network relay router 10. In the network configuration of the second embodiment, only one router as a multicast relay device is arranged both in the sender or first VPN 50A and in the receiver or second VPN 50B, so that the network relay router 10 works as a rendezvous point in both the first VPN 50A and the second VPN 50B. As in the configuration of the first embodiment, in the configuration of the second embodiment, a multicast group address as an inter-VRF relay subject, sender VRF information, and receiver VRF information are set as inter VRF relay information 142 in the network relay router 10 establishing or building multiple VPNs.

When receiving a multicast packet directly from the transmission device SE, the network relay router 10 compares a multicast group address of the received multicast packet and information on a VRF receiving the multicast packet with the multicast group address and the sender VRF information set in the inter-VRF relay information 142. In the case of matching, the network relay router 10 transfers the received multicast packet to a multicast routing protocol processing module working in a receiver VRF. In response to reception of a Report message from the receiving device RE, the receiver VRF starts relay of the transferred multicast packet between the interface 102 and the interface 105, based on sender VRF information, input interface information, receiver VRF information, and output interface information.

The operations of a VRF 51A of the network relay router 10 are described first. In the configuration of this embodiment, there is no router other than the network relay router 10 in the first VPN 50A and the network relay router 10 functions as the rendezvous point in the first VPN 50A. An inter-VRF join request transmission unit 1121A accordingly does not send the PIM(*,G)join message. A VRF manager 111A acquires and keeps the multicast group address as the inter-VRF relay subject and the sender VRF information from the inter-VRF relay information 142. A multicast packet sent from the transmission device SE is transferred to a data packet transmitting/receiving processor 113A via a VRF identification module 15. The data packet transmitting/receiving processor 113A acquires a multicast group address from the received multicast packet and searches the inter-VRF relay information kept by the VRF manager 111A for any entry corresponding to the multicast group address.

When there is any corresponding entry, the data packet transmitting/receiving processor 113A identifies the received multicast packet as the inter-VRF relay subject. A multicast route computation unit 114A then sets route information into a multicast route computation table 1141A. In the multicast route computation table 1141A, an address of the transmission device SE, the multicast group address of the received multicast packet, the sender VRF name, an input interface receiving the multicast packet, and the receiver VRF name set in the inter-VRF relay information 142 are registered respectively as source information, group information, IVRF information, IIF information, and OVRF information. There is no registry of OIF information since an output interface is unknown at this stage. At this stage, a multicast packet relay processing module 13 has not yet been notified of the information registered in the multicast route computation table 1141A, so that multicast packets are continuously sent to the data packet transmitting/receiving processor 113A. When the data packet transmitting/receiving processor 113A receives a multicast packet, the multicast route computation unit 114A searches the multicast route computation table 1141A for any entry corresponding to a source address and a multicast group address of the received multicast packet and refers to the information of the retrieved entry. When the retrieved entry corresponding to the received multicast packet includes registry of another VRF name as the OVRF information, an inter-VRF multicast packet transmission unit 1131A transfers the received multicast packet to a data packet transmitting/receiving processor 113B of a multicast routing protocol processing module 11B working in an output or receiver VRF 51B via an inter-VRF gateway processing module 16.

The operations of the receiver VRF 51B of the network relay router 10 are described below. In the configuration of this embodiment, there is no router other than the network relay router 10 in the second VPN 50B and the network relay router 10 functions as the rendezvous point in the second VPN 50B. The multicast packet transferred from the VRF 51A is thus not relayed. A multicast route computation unit 114B sets route information of the transferred multicast packet into a multicast route computation table 1141B in the VRF 51B. In the multicast route computation table 1141B, the address of the transmission device SE, the multicast group address of the transferred multicast packet, the sender VRF name including the transmission device SE, and the receiver VRF name are registered respectively as source information, group information, IVRF information, and OVRF information. There are no registries of IIF information and OIF information, since an input interface is unknown and no Report message has been received at this stage.

The network relay router 10 is directly connected with the receiving device RE and thus directly receives a Report message from the receiving device RE. Specifically the network relay router 10 receives the Report message via the interface 105 connecting with the receiving device RE. In response to reception of the Report message, the VRF identification module 15 identifies the receiver VRF 51B corresponding to the interface 105 receiving the Report message and notifies a control packet transmitting/receiving processor 112B in the identified receiver VRF 51B of the identification result. The multicast route computation unit 114B acquires a source address and a multicast group address from the received Report message and searches the multicast route computation table 1141B for any entry corresponding to the source address and the multicast group address. When there is any corresponding entry, the multicast route computation unit 114B adds the interface 105 receiving the Report message as the OIF information to the corresponding entry. When the corresponding entry in the multicast route computation table 1141B includes registry of another VRF name as the IVRF information and has no registry of the IIF information, the multicast route computation unit 114B makes an inquiry to a multicast routing protocol processing module 11A working in the sender VRF 51A via the inter-VRF gateway processing module 16. The inter-VRF gateway processing module 16 searches the multicast route computation table 1141A for any entry having the source address, the multicast group address, and its own VRF name as the OVRF information. When there is any corresponding entry, the inter-VRF gateway processing module 16 acquires the IIF information representing the input interface in the sender VRF from the entry in the multicast route computation table 1141A. The multicast routing protocol processing module 11B in the receiver VRF 51B is notified of the acquired input interface. The multicast route computation unit 114B adds the notified input interface as the IIF information to the corresponding entry in the multicast route computation table 1141B in the receiver VRF 51B and notifies the multicast packet relay processing module 13 of the updated multicast route computation table 1141B. This enables multicast communication between the first VPN 50A and the second VPN 50B. At this stage, the output interface in the receiver VRF is added as the OIF information to the corresponding entry in the multicast route computation table 1141A in the sender VRF 51A.

FIG. 21 is an explanatory diagrammatic representation of the multicast route computation table 1141A stored in the sender VRF 51A. Route information of the received multicast packet is set in the multicast route computation table 1141A. The sender address or source address, the multicast group address or destination address, the VRF 51A including the transmission device SE, the input interface 102, and the VRF 51B including the receiving device RE are registered respectively as the source information, the group information, the IVRF information, the IIF information, and the OVRF information in the multicast route computation table 1141A. There is no registry of the OIF information since the output interface is unknown at this stage.

FIG. 22 is an explanatory diagrammatic representation of the multicast route computation table 1141B stored in the receiver VRF 51B. Route information of the multicast packet transferred from the VRF 51A is set in the multicast route computation table 1141B. The sender address or source address, the multicast group address or destination address, the VRF 51A including the transmission device SE, and the VRF 51B including the receiving device RE are registered respectively as the source information, the group information, the IVRF information, and the OVRF information in the multicast route computation table 1141B. There are no registries of the IIF information and the OIF information since the input interface is unknown and there is no output interface at this stage.

FIG. 23 is an explanatory diagrammatic representation of the multicast route computation table 1141B stored in the receiver VRF 51B after reception of a Report message from the receiving device RE. When a Report message is received from the receiving device RE, the multicast route computation unit 114B adds the output interface 105 receiving the Report message as the OIF information in the multicast route computation table 1141B. When the IVRF information is different from the OVRF information and there is no registry of the IFF information, the inter-VRF gateway processing module 16 makes an inquiry to the sender VRF 51A to acquire information on the input interface connecting with the transmission device SE and registers the acquired input interface 102 as the IIF information. The multicast packet relay processing module 13 is notified of the multicast route computation table 1141B updated with addition of the registries of the input interface 102 and the output interface 105 as the IIF information and the OIF information. Such notification enables inter-VRF multicast communication.

FIG. 24 is an explanatory diagrammatic representation of the multicast route computation table 1141A stored in the sender VRF 51A after additional registry of the OIF information by the inter-VRF gateway processing module 16 after reception of the Report message. The interface 105 receiving the Report message is added as the OIF information in the multicast route computation table 1141A.

In the network configuration of the second embodiment, the network relay router 10 functions both as the rendezvous point in the first VPN 50A and as the rendezvous point in the second VPN 50B. This enables relay of a multicast packet between the transmission device SE and the receiving device RE belonging to the different networks without establishing of a shortest route. The network configuration of the second embodiment can omit the route establishment process and the join request process, which are performed at the router arranged on the route from the rendezvous point to the network relay router 10 in the network configuration of the first embodiment.

Third Embodiment

As in the network configuration of the first embodiment, in a network configuration of a third embodiment according to the invention, a multicast group address as an inter-VRF relay subject, a sender VRF name, and a receiver VRF name are registered in a network relay router 10 establishing or building multiple VPNs. The network relay router 10 of the third embodiment sends a PIM(*,G)join message to a rendezvous point in a sender VPN, in response to reception of a PIM(*, G)join message from a router 20*b*. Namely the setting of route information in the network relay router 10 alone does not trigger transmission of the PIM(*,G)join message to the rendezvous point in the sender VPN. Namely a multicast packet sent from a transmission device SE is not relayed to the network relay router 10 immediately after completion of the setting. Inter-VRF multicast relay starts after reception of a join request message from a receiving device RE. This arrangement desirably restricts or prevents unnecessary multicast relay prior to reception of the join request message. In the network configuration of the third embodiment, the network relay router 10 functions as a rendezvous point in a receiver VPN. The PIM(*,G)join message sent from the router 20*b* in response to reception of a Report message from the receiving device RE is thus always transmitted to the network relay router 10. Reception of the PIM(*,G)join message from the router 20*b* triggers transmission of a PIM(*,G) join message from the network relay router 10 to the rendezvous point 30*a* in the sender VPN. After transmission of the PIM(*,G)join message to the sender VPN, an inter-VRF multicast route is established in the same manner as explained in the first embodiment.

Figure 25:
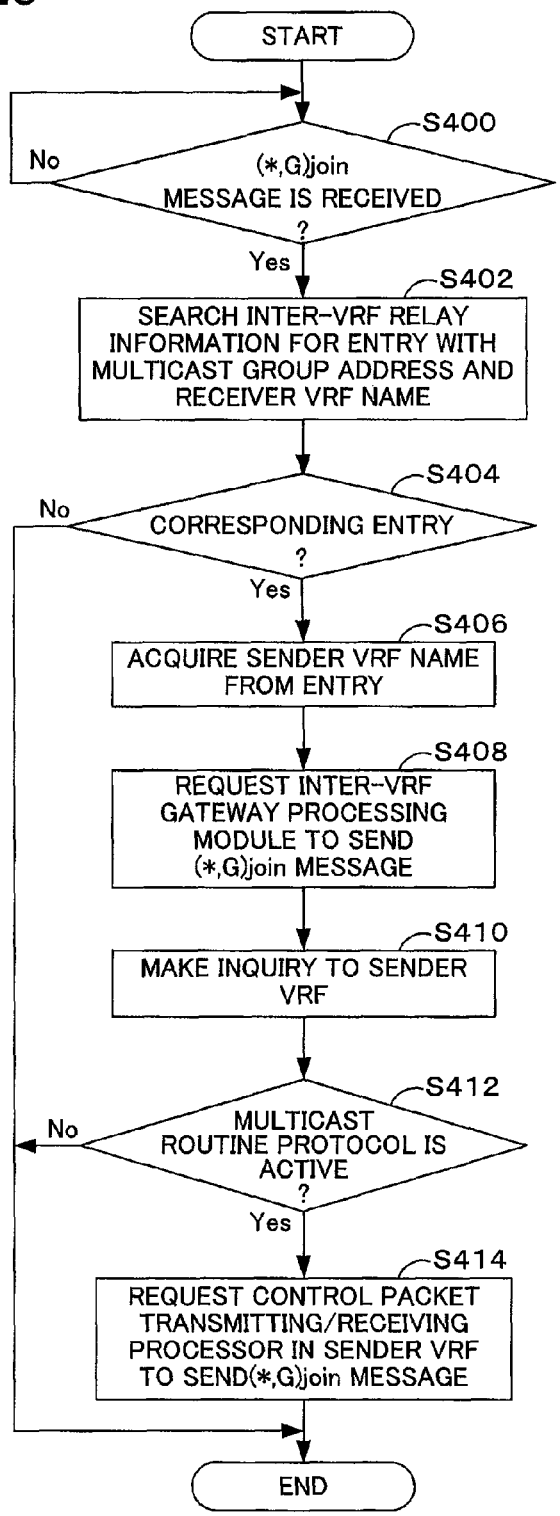
FIG. 25 is a flowchart showing a processing routine performed by a network relay router according to a third embodiment of the invention to make a request for transmission of a PIM(*,G)join message in a sender VRF in response to reception of a PIM(*,G)join message in a receiver VRF.

The network relay router 10 of the third embodiment has the same internal structure as that of the network relay router 10 of the first embodiment. The like components are expressed by the like numerals and symbols and are not specifically described here. In the network configuration of the third embodiment, a multicast group address as an inter-VRF relay subject, a sender VRF name, and a receiver VRF name are externally registered in advance in inter-VRF relay information 142. FIG. 25 is a flowchart showing a processing routine performed by the network relay router 10 to make a request for transmission of a PIM(*,G)join message in a sender VRF 51A in response to reception of a PIM(*,G)join message in a receiver VRF 51B.

This processing routine does not proceed until reception of a PIM(*,G)join message in the receiver VRF 51B (step S400: No). The PIM(*,G)join message received via an interface 105 from the router 20*b* connecting with the receiving device RE (step S400: Yes) goes through a VRF identification module 15 and is transferred to a control packet transmitting/receiving processor 112B. The control packet transmitting/receiving processor 112B acquires a multicast group address from the received PIM(*,G)join message and searches the inter-VRF relay information 142 for any entry corresponding to the acquired multicast group address (step S402). Specifically the control packet transmitting/receiving processor 112B searches the inter-VRF relay information 142 for any entry having the acquired multicast group address and further retrieves any entry with the registry of its VRF name 'VRF 51B' from any matching entries. When there is any corresponding entry having the multicast group address and its own VRF name (step S404: Yes), the control packet transmitting/receiving processor 112B acquires a sender VRF name from the corresponding entry (step S406).

The control packet transmitting/receiving processor 112B notifies the inter-VRF gateway processing module 16 of the acquired sender VRF name and multicast group address and makes a request for transmission of the PIM(*,G)join message (step S408). When there is no corresponding entry (step S404: No), on the other hand, the network relay router 10 terminates this processing routine. In response to the request, the inter-VRF gateway processing module 16 makes an inquiry with the notified sender VRF name to the multicast routing protocol processing module 11A working in the sender VRF 51A (step S410). The inter-VRF gateway processing module 16 determines whether the multicast routing protocol is active on the sender VRF 51A (step S412). Specifically the inter-VRF gateway processing module 16 determines whether VRF information 141 has the registry of the notified sender VRF name. When determining that the multicast routing protocol processing module 11A is activated (step S412: Yes), the inter-VRF gateway processing module 16 notifies a control packet transmitting/receiving processor 112A in the sender VRF 51A of the multicast group address and makes a request for transmission of the PIM(*,G)join message (step S414). The network relay router 10 here terminates this processing routine. In response to this transmission request, the control packet transmitting/receiving processor 112A in the sender VRF 51A sends the PIM(*,G)join message for the notified multicast group address via its inter-VRF join request transmission unit 1121A to the rendezvous point 30*a*.

When the inter-VRF gateway processing module 16 determines that the multicast routing protocol processing module 11A is not activated (step S412: No), the network relay router 10 terminates this processing routine. After transmission of the PIM(*,G)join message to the rendezvous point 30*a*, an inter-VRF multicast route is established in the same manner as explained in the first embodiment.

The network relay router 10 of the third embodiment desirably prevents or restricts unnecessary multicast relay. The network relay router 10 of this embodiment establishes an inter-VRF multicast route triggered by reception of the PIM (*,G)join message from the receiving device RE. Namely relay of a multicast packet is enabled only in the presence of any receiving device of multicast packets. This arrangement prevents or restricts unnecessary multicast relay, thus reducing the traffic.

The network configuration of the third embodiment is implemented by simply replacing only the rendezvous point in the receiver VPN with the network relay router 10. This arrangement assures the similar functions and effects to those of the first embodiment, while minimizing modification required for the settings in an existing network according to the PIM-SM protocol.

Fourth Embodiment

In the network configurations of the first through the third embodiments, information required for inter-VRF relay is externally set and stored in the network relay router 10 establishing and building multiple VPNs. In a network configuration of a fourth embodiment according to the invention, on the other hand, a network relay router 10 automatically generates inter-VRF relay information, based on a received PIM(*,G) join message and a received multicast packet. Namely inter-VRF multicast packet communication is implemented without requiring external information setting. The network relay router 10 of the fourth embodiment has the same internal structure as that of the network relay router 10 of the first embodiment. The like components are expressed by the like numerals and symbols and are not specifically described here. In the network configuration of the fourth embodiment, rendezvous points in both a first VPN 50A and a second VPN 50B are set in the network relay router 10. Multicast packets sent from a transmission device SE are thus always relayed to the network relay router 10 functioning as the rendezvous point. The PIM(*,G)join message from a router 20b connecting with a receiving device RE is always relayed to the network relay router 10 functioning as the rendezvous point.

Figure 26:
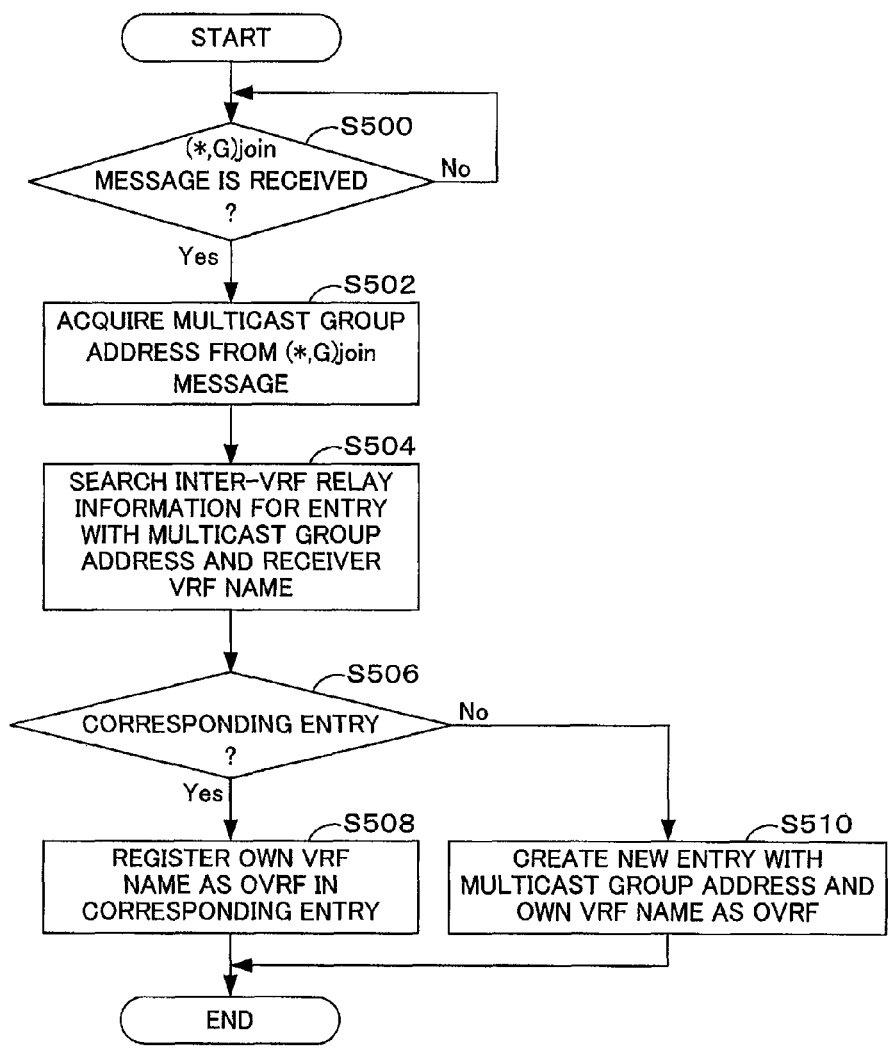
FIG. 26 is a flowchart showing a processing routine performed by a network relay router according to a fourth embodiment of the invention to automatically generate inter-VRF relay information in response to reception of a PIM(*, G)join message and a multicast packet by a receiver VRF.

FIG. 26 is a flowchart showing a processing routine performed by the network relay router 10 to automatically generate inter-VRF relay information in response to reception of a PIM(*,G)join message and a multicast packet in a receiver VRF 51B. This processing routine does not proceed until reception of a PIM(*,G)join message in the receiver VRF 51B (step S500: No). The PIM(*,G)join message received via an interface 105 from a router 20b connecting with the receiving device RE (step S500: Yes) goes through a VRF identification module 15 and is transferred to a control packet transmitting/receiving processor 112B. The control packet transmitting/receiving processor 112B acquires a multicast group address from the received PIM(*,G)join message (step S502) and searches inter-VRF relay information 142 for any entry corresponding to the acquired multicast group address (step S504). Specifically the control packet transmitting/receiving processor 112B searches the inter-VRF relay information 142 for any entry having the acquired multicast group address and further retrieves any entry with the registry of its VRF name 'VRF 51B' from any matching entries. When there is any corresponding entry having the multicast group address and its own VRF name (step S506: Yes), the control packet transmitting/receiving processor 112B registers its own VRF name as OVRF information in the corresponding entry in the inter-VRF relay information 142 (step S508). The network relay router 10 then terminates this processing routine. When there is no corresponding entry (step S506: No), on the other hand, the control packet transmitting/receiving processors 112B creates a new entry with registries of the acquired multicast group address as group information and the own VRF name as receiver VRF information or OVRF information in the inter-VRF relay information 142 (step S510). The network relay router 10 then terminates this processing routine.

Figure 27:
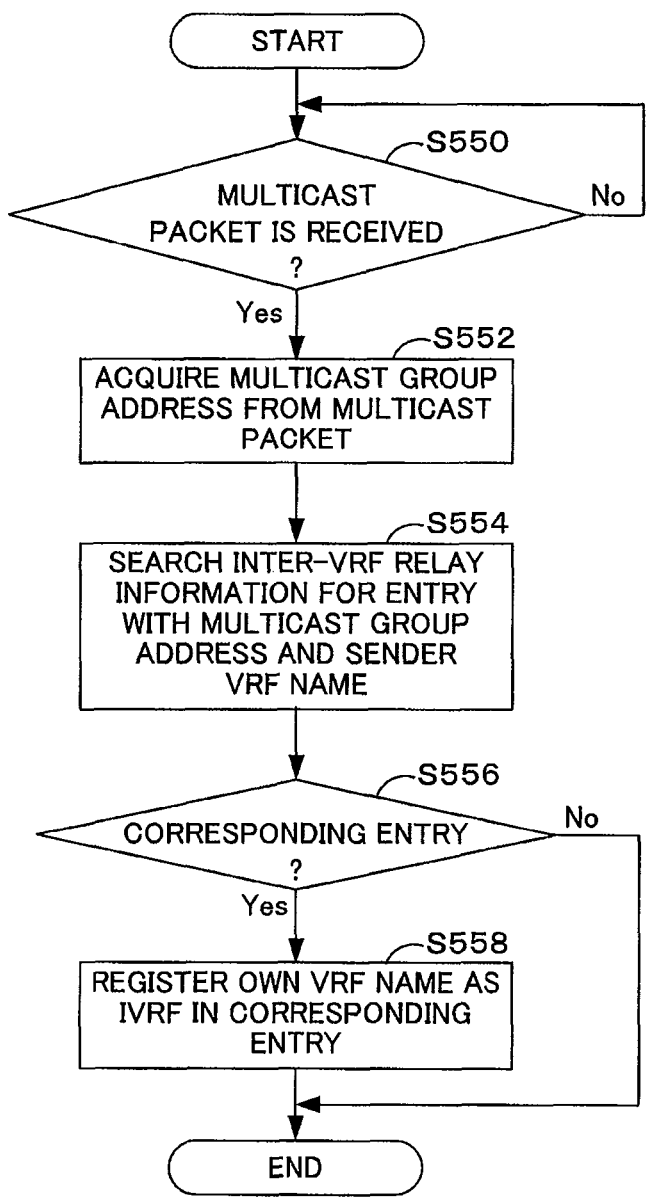
FIG. 27 is a flowchart showing a processing routine performed by the network relay router of the fourth embodiment to automatically generate inter-VRF relay information in response to reception of a multicast packet by a sender VRF.

FIG. 27 is a flowchart showing a processing routine performed by the network relay router 10 to automatically generate the inter-VRF relay information in response to reception of a multicast packet in a sender VRF 51A. This processing routine does not proceed until reception of a multicast packet from the transmission device SE in the sender VRF 51A (step S550: No). As mentioned above, in the network configuration of this embodiment, multicast packets sent from the transmission device SE are always relayed to the network relay router 10 functioning as the rendezvous point. A multicast packet received via an interface 102 from a router 20a connecting with the transmission device SE (step S550: Yes) goes through the VRF identification module 15 and is transferred to a data packet transmitting/receiving processor 113A. The data packet transmitting/receiving processor 113A acquires a multicast group address and a source address from the received multicast packet (step S552) and searches the inter-VRF relay information 142 for any entry corresponding to the acquired multicast group address (step S554). Specifically the data packet transmitting/receiving processor 113A searches the inter-VRF relay information 142 for any entry having the acquired multicast group address and further retrieves any entry with the registry of its VRF name 'VRF 51A' from any matching entries.

When there is no corresponding entry (step S556: No), the network relay router 10 terminates this processing routine. When there is any corresponding entry having the multicast group address and its own VRF name (step S556: Yes), the data packet transmitting/receiving processor 113A registers its own VRF name as sender VRF information or IVRF information in the corresponding entry in the inter-VRF relay information 142, so as to update the inter-VRF relay information 142 (step S558). The network relay router 10 terminates the processing routine. A control packet transmitting/receiving processor 112A sends a PIM(S,G)join message to an adjacent router RPF neighbor based on the acquired source address via its inter-VRF join request transmission unit 1121A. A multicast packet received in response to transmission of the PIM(S,G)join message to the adjacent router RPF neighbor is transferred to the receiver VRF 51B. An inter-VRF multicast route is then established in the same manner as explained in the first embodiment.

In the network configuration of the fourth embodiment, the rendezvous points in both the sender VPN and the receiver VPN are set in the network relay router 10. Inter-VRF multicast relay is thus implemented without requiring previous setting of the inter-VRF relay information 142. This arrangement does not require the network administrator's previous setting and facilitates the network management.

In the network configuration of the fourth embodiment, the rendezvous points in both the sender VPN and the receiver VPN are set in the network relay router 10. Inter-VPN relay of a multicast packet is thus implemented by simply establishing a communication route between the transmission device SE and the network relay router 10 and a communication route between the network relay router 10 and the receiving device RE. This arrangement desirably allows for omission of transmission of messages and multicast packet between the rendezvous points and the network relay router 10, thus enhancing the efficiency of multicast relay.

In the network configuration of the fourth embodiment, the information on the multicast group specified as the inter-VRF relay subject is set in the network relay router 10 establishing the multiple VPNs. This enables inter-VRF multicast relay. Plural multicast groups may be set as the inter-VRF relay subject. Such setting allows for multicast relay between multiple different VPNs with multiple receiving devices and transmission devices. The PIM-SM protocol is used as the multicast routing protocol. This allows for inter-VRF multicast relay even when multiple transmission devices are present in one VPN.

[Operations of Intermediate Router]

In the first embodiment described above, for the simplicity of explanation, it is assumed that there is no router arranged between the router 20a connecting with the transmission device SE or the router 20b connecting with the receiving device RE and the network relay router 10. The technique of the invention is similarly applicable to network configuration where an intermediate router is located between the route 20a or 20b and the network relay router 10.

When receiving a PIM(*,G)join message from the router 20b connecting with the receiving device RE, the intermediate router sequentially sends the PIM(*,G)join message to the router 30a or the router 30b as the rendezvous point. When receiving a PIM(*,G)join message from the router 30a or the router 30b as the rendezvous point, the intermediate router sequentially sends the PIM(*,G)join message to the router 20a connecting with the transmission device SE.

When receiving a multicast packet from the router 20*a* connecting with the transmission device SE, the intermediate router sends the multicast packet to the router 30*a* or the router 30*b* as the rendezvous point. When receiving a multicast packet from the router 30*a* or the router 30*b* as the rendezvous point, the intermediate router sends the multicast packet to the router 20*b* connecting with the receiving device RE.

When receiving a PIM(S,G)join message from the router 20*b* connecting with the receiving device RE, the intermediate router sends the PIM(S,G)join message to an adjacent router in the direction of connection with the transmission device SE via an interface. When receiving a multicast packet from the transmission device SE, the intermediate router sends the multicast packet to an adjacent router in the direction of connection with the receiving device RE via an interface.

In this modified network configuration, the network relay router 10 is allowed to send the PIM(*,G)join message and the PIM(S,G)join message to the router 20*a* and to receive a multicast packet from the router 20*a*. The network relay router 10 is also allowed to receive the PIM(*,G)join message and the PIM(S,G)join message from the router 20*b* and to send a multicast packet to the router 20*b*.

[Modifications]

(1) The rendezvous point may be set manually or may be set automatically by the BSR (bootstrap router) protocol.

(2) For the simplicity of explanation, the network configurations of the embodiments discussed above have two VPNs, the first VPN and the second VPN. The technique of the invention is similarly applicable to relay of a multicast packet between three or more VPNs. Namely the technique of the invention is applicable to combinations of one VRF manager 111A (first VPN) and multiple VRF managers 111B (second VPNs).

(3) For the simplicity of explanation, relay of a multicast packet sent from one transmission device is described in the above embodiments. The technique of the invention is similarly applicable to relay of multicast packets sent from two or more transmission devices. In such a network configuration, establishment of the communication route described above should be performed with regard to each transmission device.

(4) In the embodiments described above, the CPU performs the programs stored in the memory or the functional modules to actualize the respective functions of the network relay router 10. The functions of the network relay router 10 may alternatively be implemented by hardware components, such as logic circuits.

(5) In the embodiments discussed above, the network relay router 10 is activated according to the PIM-SM protocol. The network relay router 10 of the embodiment may also be activated according to another protocol configured to detect a transmission device and start receiving a multicast packet from the detected transmission device by some trigger from a receiving device. The network configurations of the above embodiments use the rendezvous points according to the PIM-SM protocol. The network relay router 10 of the embodiment may also be activated in the network configuration without rendezvous points. The network relay router 10 of the embodiment is effectively activated in any network configuration where the network relay router 10 functions as a receiving device in a sender VPN including a transmission device to establish a communication route for a multicast packet in the sender VPN and functions as a transmission device in a receiver VPN including a receiving device.

(6) In the embodiments discussed above, a multicast group address may be set arbitrarily in correlation to each combination of VRFs. The multicast group address used in the second VPN 50B for receiving a multicast packet from the first VPN 50A is preferably set to be different from the multicast group address used for relaying the multicast packet in the second VPN 50B. Such setting allows for unequivocal identification of whether relay of a multicast packet within a VRF is required or inter-VRF relay of a multicast packet is required, based on the multicast group address.

The embodiments and their modified examples discussed above are to be considered in all aspects as illustrative and not restrictive. There may be many other modifications, changes, and alterations without departing from the scope or spirit of the main characteristics of the present invention. All changes within the meaning and range of equivalency of the claims are intended to be embraced therein. The scope and spirit of the present invention are indicated by the appended claims, rather than by the foregoing description.

This application relates to and claims priority from Japanese Patent Application No. 2009-128516, filed on Jun. 28, 2009, the entire disclosure of which is incorporated by reference.

What is claimed is:

1. A network relay apparatus constructed to relay a multicast packet between plural logically different virtual networks, the network relay apparatus comprising:

a first management module configured to manage communications of a first virtual network;

a second management module configured to manage communications of a second virtual network; and an intra-device relay module configured to relay the multicast packet for a preset multicast group between the first management module and the second management module, the first management module having:

a transmission apparatus information acquisition module configured to generate a join message for joining the preset multicast group, and to send the join message toward a transmission apparatus in the first virtual network, and to acquire, from the first virtual network, transmission apparatus information used for identifying the transmission apparatus in the first virtual network in response to the join message;

a first communication route establishment module configured to refer to the acquired transmission apparatus information, and to establish a communication route of the first virtual network between the transmission apparatus in the first virtual network and the first management module on the basis of the acquired transmission apparatus information; and a transfer module configured to transfer a multicast packet, which is received from the transmission apparatus via the established communication route, to the intra-device relay module, the second management module having:

a multicast packet receiving module configured to receive the multicast packet from the intra-device relay module; and a multicast packet transmission module configured to send the received multicast packet to a receiving apparatus in the second virtual network, which makes a request for receiving the multicast packet from the first virtual network, the intra-device relay module having:

a relay information storage module configured to store a relay condition for the multicast packet for the preset multicast group to be relayed from the first management module to the second management module; and an intra-device transmission module configured to control the multicast packet to be relayed from the first management module to the second management module, based on the stored relay condition, and wherein the transmission apparatus information acquisition module in the first management module sends the join message to the first virtual network at preset time intervals, in order to acquire the transmission apparatus information, the relay condition is set to assign the first management module as a sender and the second management module as a receiver for inter-network relay of the multicast packet for the preset multicast group, the intra-device transmission module in the intra-device relay module relays the multicast packet from the first management module to the second management module based on the relay condition, wherein in response to reception of a join request for the preset multicast group from the receiving apparatus in the second virtual network, the second management module sends a request for transmission of a join message to the transmission apparatus information acquisition module in the first management module via the intra-device relay module, the transmission apparatus information acquisition module receives the request for transmission of the join request from the intra-device relay module and sends the join request to the first virtual network, and the network relay apparatus further comprising:

a relay information generation module configured, when a join message for the preset multicast group is received from the receiving apparatus in the second virtual network, to assign the second management module as the receiver in the relay condition, and when the multicast packet is received from the transmission apparatus in the first virtual network as a response to transmission of the join request for the preset multicast group, to additionally assign the first management module as the sender in the relay condition.

2. The network relay apparatus in accordance with claim 1, wherein the second management module further has a second communication route establishment module configured to, in response to reception of the multicast packet from the first management module via the intra-device relay module, establish a route of the second virtual network for sending the multicast packet to the receiving apparatus.

3. The network relay apparatus in accordance with claim 1, wherein the intra-device relay module further has an intra-device route information exchange module configured to exchange information on the first virtual network, the acquired transmission apparatus information, information on the second virtual network, and receiving apparatus information used for identifying the receiving apparatus, between the first management module and the second management module.

4. The network relay apparatus in accordance with claim 1, the network relay apparatus functioning as a rendezvous point in the second virtual network.

5. The network relay apparatus in accordance with claim 1, wherein the second management module further has a second communication route establishment module configured to, in response to reception of a join message for the preset multicast group from the receiving apparatus in the second virtual network, establish a route of the second virtual network for sending the multicast packet to the receiving apparatus.

6. The network relay apparatus in accordance with claim 4, the network relay apparatus functioning as a rendezvous point in the first virtual network.

7. The network relay apparatus in accordance with claim 1, wherein the preset multicast group does not overlap with another multicast group in the second virtual network.

8. The network relay apparatus in accordance with claim 1, wherein the relay condition stored in the relay information storage module includes a multicast group address, which is settable independently of a combination of the first virtual network managed by the first management module and the second virtual network managed by the second management module and is specified either as an individual address or an address range.

9. An inter-network relay method adopted in a network relay apparatus constructed to relay a multicast packet between logically different multiple networks, the inter-network relay method comprising:

generating a join message for joining a multicast group, and sending the join message toward a transmission apparatus in the first virtual network;

acquiring, from the first virtual network, transmission apparatus information used for identifying the transmission apparatus in the first virtual network in response to the join message;

establishing a communication route of the first virtual network between the transmission apparatus in the first virtual network and a first management module that is configured to manage the first virtual network by referring to the acquired transmission apparatus information;

transferring the multicast packet, which is received from the transmission apparatus via the established communication route, to an intra-device relay module, which is configured to relay the multicast packet between the first management module and second management module that is configured to manage a second virtual network;

controlling the multicast packet to be relayed from the intra-device relay module to the second management module, based on a relay condition for the multicast packet to be relayed from the first management module to the second management module; and sending the multicast packet received from the second management module to a receiving apparatus in the second virtual network, which makes a request for receiving the multicast packet from the first virtual network, wherein the acquiring of the transmission apparatus information includes sending the join request to the first virtual network at preset time intervals, in order to acquire the transmission apparatus information, the relay condition is set to assign the first management module as a sender and the second management module as a receiver for inter-network relay of the multicast packet for the preset multicast group, the transferring of the multicast packet includes relaying the multicast packet to the second management module based on the relay condition via the intra-device relay module, the join request for the preset multicast group is sent to the first virtual network by the first management module in response to reception of a join message for the preset multicast group from the receiving apparatus in the second virtual network by intervention of the second management module via the intra-device relay module, when a join message for the preset multicast group is received from the receiving apparatus in the second virtual network, assigning the second management module as the receiver in the relay condition, and when the multicast packet is received from the transmission apparatus in the first virtual network as a response to transmission of the join request for the preset multicast group, additionally assigning the first management module as the sender in the relay condition.

10. The inter-network relay method in accordance with claim 9, the network relay method further comprising:
in response to reception of the multicast packet from the first management module via the intra-device relay module, establishing a route of the second virtual network for sending the multicast packet to the receiving apparatus.

11. The inter-network relay method in accordance with claim 9, the network relay method further comprising:
generating an intra-device multicast packet route by exchanging information on the first virtual network, the acquired transmission apparatus information, information on the second virtual network, and receiving apparatus information used for identifying the receiving apparatus, between the first management module and the second management module.

\* \* \* \* \*